(12) United States Patent
Cloke et al.

(10) Patent No.: US 6,292,912 B1
(45) Date of Patent: *Sep. 18, 2001

(54) DISK DRIVE HAVING BUILT-IN SELF-TEST SYSTEM FOR CHARACTERIZING PERFORMANCE OF THE DRIVE

(75) Inventors: Robert Leslie Cloke, Santa Clara; Patrick James Lee, San Jose; Howard Anthony Baumer, Laguna Hills, all of CA (US)

(73) Assignee: Western Digital Technologies, Inc., Lake Forest, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,220

(22) Filed: Feb. 27, 1998

(51) Int. Cl.[7] .................................................. G11C 29/00
(52) U.S. Cl. .......................... 714/718; 714/704; 714/794; 714/795; 714/796; 360/53; 360/31
(58) Field of Search ............................ 714/718, 794–795, 714/704, 769, 765, 775; 455/425, 701, 788; 375/141, 146, 147; 370/342, 441; 360/51, 45, 46, 61, 49, 53, 365, 135, 31; 324/210; 427/554; 369/124.15

(56) References Cited

U.S. PATENT DOCUMENTS

| | | |
|---|---|---|
| 5,121,263 | 6/1992 | Kerwin et al. . |
| 5,168,413 * | 12/1992 | Coker et al. ..................... 360/137 |
| 5,214,687 * | 5/1993 | Kansakoski et al. ............. 455/425 |
| 5,329,547 * | 7/1994 | Ling ..................................... 370/342 |
| 5,355,261 | 10/1994 | Taratorin . |
| 5,493,454 * | 2/1996 | Ziperovich et al. ................. 360/45 |
| 5,754,353 | 5/1998 | Behrens et al. . |
| 5,852,614 * | 12/1998 | Stephens et al. ..................... 714/701 |
| 5,889,784 * | 3/1999 | Rogers .................................. 714/704 |
| 5,914,594 * | 6/1999 | Mian ..................................... 324/210 |
| 5,970,093 * | 10/1999 | de Lantremange ................. 375/234 |
| 5,978,189 * | 11/1999 | Habu ..................................... 360/135 |
| 6,208,477 * | 3/2001 | Cloke et al. ............................. 360/31 |

OTHER PUBLICATIONS

Welland, D.; Phillip, S.; Tuttle, T.; Ka Leung; Dupuie, S.;

(List continued on next page.)

*Primary Examiner*—Albert Decady
*Assistant Examiner*—Guy Lamarre
(74) *Attorney, Agent, or Firm*—Milad G Shara

(57) ABSTRACT

A disk drive has a normal mode of operation and a built-in self-test (BIST) mode of operation for producing a sequence of channel metrics $\{\Gamma_n\}$. The disk drive includes a recording surface having a plurality of bit cells and a transducer for reading the plurality of bit cells to produce a noise-corrupted read signal. The disk drive further includes means responsive to the noise-corrupted read signal for generating a sequence of observed samples $\{y_n\}$, the sequence of observed samples $\{y_n\}$ forming a sequence of observed-sample subsequences $\{Y_n\}$. An expected sample generator operates during the BIST mode of operation to provide a sequence of expected samples $\{w_n\}$, the sequence of expected samples forming a sequence of expected-sample subsequences $\{W_n\}$. A channel metrics $\Gamma_n$ computation system computes a sequence of channel metrics $\{\Gamma_n\}$. Each channel metric $\Gamma_n$ is a function of a distance determined from one of the observed-sample subsequences $Y_n$ to the corresponding expected-sample subsequence $W_n$. Each channel metric $\Gamma_n$ is independent of the earliest observed sample in every prior observed-sample subsequence $Y_n$ and the earliest expected sample in every prior expected-sample subsequence $W_n$.

12 Claims, 10 Drawing Sheets

OTHER PUBLICATIONS

Holberg, D.; Jack, R.; Sooch, N.; Behrens, R.; Glover, N.; King, L., "Implementation of a digital read/write channel with EEPR4 detection", Magnetics, IEEE Transactions on., vol.: 31 2, pp. 1, Mar. 1995.*

Ziperovich, P.A., "Performance degredation of PRML channels due to nonlinear distortions", Magnetics, IEEE Transactions On., vol.: 27 6 2, pp. 4825–4827, Nov. 1991.*

Raphaeli, D., "Iterative Cochannel interference cancellation in synchronous CDMA on a frequency selective channel", Universal Personal Communications, 1996. Record., 1996 5th IEEE International Conference on., vol. 1, pp. 336–340.*

Kubo, H.; Murakami, K.; Fujino, T., "Adaptive maximum–lielihood sequence estimation by means of combined equalization and decoding in fading environments", Selected Areas in Communications, IEEE Journal on, vol. 13 1, pp. 102–109, Jan. 1995.*

R.D. Cideciyan, F. Dolivio, R. Hermann, et al., "A PRML system for Digital Magnetic Recording" IEEE Journ. Selected Areas in Communications, vol. 10, No. 1, pp. 38–56, 1992.

R. W. Wood and D. A. Petersen, "Viterbi Detection of Class IV Partial Response on a Magnetic Recording Channel" IEEE Trans. Communications, vol. 34, No. 5, pp. 454–461, 1986.

D.C. Palmer and J.D. Coker, "Media Design Considerations of Class IV Partial Response on a Magnetic Recording Channel," IEEE Trans. Magnetics, vol. 29, No. 1, pp. 189–194, 1993.

* cited by examiner

| EXPECTED CORRECT SAMPLE SUBSEQUENCE $R_k$ | | STATE | CHANNEL METRIC $\Gamma_n$ EQUATION | TRELLIS DIAGRAM PATH ROUTE | |
|---|---|---|---|---|---|
| $r_{n-1}$ | $r_n$ | $S_n$ | | $S_{n-2}$ | $S_n$ |
| 0 | -1 | - | $2(y_{n-1} - y_n)$ | | |
| +1 | -1 | - | $-2 + 2(y_{n-1} - y_n)$ | | |
| -1 | 0 | - | $-2(y_{n-1} - y_n)$ | | |
| 0 | 0 | - | $2 - 2(y_{n-1} - y_n)$ | | |
| 0 | 0 | + | $2 + 2(y_{n-1} - y_n)$ | | |
| +1 | 0 | + | $2(y_{n-1} - y_n)$ | | |
| -1 | +1 | + | $-2 - 2(y_{n-1} - y_n)$ | | |
| 0 | +1 | + | $-2(y_{n-1} - y_n)$ | | |

FIG. 7

KEY --- ERROR PATH
— CORRECT PATH

DISK DRIVE HAVING BUILT-IN SELF-TEST SYSTEM FOR CHARACTERIZING PERFORMANCE OF THE DRIVE

BACKGROUND OF THE INVENTION

1. Field of the Invention

The present invention relates to a disk drive such as a magnetic hard disk drive. More particularly, the present invention relates to such a drive having a built-in self-test system for characterizing performance of the drive.

2. Description of the Prior Art

A huge market exists for bard disk drives for mass-market host computer systems such as servers, desktop computers, and laptop computers. To be competitive in this market, a hard disk drive must be relatively inexpensive, and must accordingly embody a design that is adapted for low-cost mass production In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

An appreciable portion of such research and development has been, and continues to be, directed to developing effective and efficient ways to conduct, as part of the manufacturing process, unit-by-unit testing of drives. One aspect of such testing relates to determining the effect random noise has on drive performance. Data produced from such testing are useful in tuning processes directed to improving drive performance. Another aspect of such testing relates to determining the existence and location of defects such as defects in the media.

Random noise presents difficulties particularly in circumstances in which its magnitude is material in relation to the magnitude of a signal. In other words, a low signal-to-noise ratio ("S/N") presents problems. In a drive, a low S/N presents problems in attempting to achieve high areal density. Areal storage density relates to the amount of data storage capacity per unit of area on the recording surfaces of the disks. The available areal density may be determined from the product of the track density measured radially and the linear bit density measured along the tracks.

The available linear bit density depends on numerous factors including the performance capability of certain circuitry that is commonly referred to as a "read channel." One type of read channel is referred to as a peak-detecting channel; another type is referred to as a sampled-data channel. The type referred to as a sampled-data channel is a category including a partial response, maximum likelihood ("PRML") channel, a EPR4 channel, and a E$^2$PR4 channel.

In a hard disk drive having any of these read channels, the read channel receives an analog read signal from a transducer during a read operation. The analog read signal is characterized by a "channel frequency." As used in this art, "channel frequency" is the reciprocal of a time period "T," where the "T" is the time period consumed while an elemental-length magnet passes under the transducer during a read operation with the disk spinning at a constant angular velocity. In this regard, the length of each magnet recorded along a track as a result of a write operation is, to a first order of approximation, either an elemental length or an integer multiple of the elemental length. Each elemental length magnet can be referred to as a "bit cell" that is defined during a write operation.

The analog read signal always contains some random noise. The analog read signal, and certain other signals produced by processing the analog read signal and that also contain noise, are referred to herein as noise-corrupted signals. One such other noise-corrupted signal is a signal produced by filtering the analog read signal by means of a low-pass filter. Such filtering may reduce but not eliminate noise, and the filtered signal is also noise corrupted. Further signal processing in the read channel provides for producing a digital signal comprising detected symbols, any of which can be in error in representing recovered data. Such a digital signal is referred to herein as an error-prone signal.

In a hard disk drive employing a peak detecting channel, digital data are represented in the media by transitions between oppositely magnetized bit cells. Provided that the transitions between oppositely magnetized bit cells do not unduly interfere with each other, each such transition causes a peak in the analog read signal, and a peak-detecting channel employs a peak detector that detects such peaks, and produces digital signal in the form of a serial, binary-valued signal that is an error-prone signal for numerous reasons. One reason why the peak detector produces an error-prone signal is random noise; this source of error presents a problem for any type of channel. Another reason relates to interference between adjacent transitions. Interference between such transitions is referred to as intersymbol interference and adversely affects performance of a peak detecting channel increasingly as a function of channel rate.

A sampled-data channel employs sampling circuitry that samples a noise-corrupted analog read signal to produce a sequence of noise-corrupted samples. The samples so produced are provided in sequence to a detector. Such a detector may be organized such that its detection decisions are based on a sequence of the samples. Such a detector is sometimes called a "maximum likelihood sequence detector." A so-called "Viterbi detector" is an example of a maximum likelihood sequence detector. In a sampled-data channel employing a Viterbi detector, circuitry responds to the noise-corrupted samples to produce error-prone symbols and the produced error-prone symbols are mapped to binary-valued error-prone symbols. In a PRML channel, such internally-produced error-prone symbols are often referred to as: "−1"; "0"; and "+1"; and the binary-valued error-prone symbols are supplied to a deserializer to produce a parallel-by-bit digital signal.

Prior art methods for characterizing the performance of a disk drive are time consuming, costly, and inefficient. Prior art methods include various ways to perform test operations to produce either a bit error rate ("BER") or a histogram of noise magnitudes.

A BER of $10^{-x}$ means that, on the average, there is no more than one error per $10^{-x}$ bits. A raw BER for a disk drive is typically in the range of $10^{-6}$ BER to $10^{-10}$ BER. The raw BER is estimated without using an ECC correction system to correct errors in a data sequence. A user BER is usually lower than the raw BER and is improved using the ECC correction system.

The BER can be used for fine tuning electronic components in the disk drive. The BER test is commonly repeated after tuning the electronic components.

Prior art methods for estimating the BER require a protracted read operation that involves reading a large number of samples and counting the number of bit errors that occur during the read operation. Prior art methods commonly require reading $10^8$ samples to produce a reasonably precise estimate of BER when BER is in the neighborhood of $10^{-6}$ BER This is time consuming and inefficient. Other prior art methods require using large and expensive test equipment to produce an estimate of the BER. This is costly as well as inefficient for use in the manufacturing environment.

U.S. Pat. No. 4,578,721 discloses a "window margin" method for estimating the bit error rate for disk drives employing peak detection read channels. The "window margin" method is not suitable for disk drives employing sampled data detection channels.

U.S. Pat. No. 5,355,261 discloses a method for estimating a BER for disk drives having a partial response maximum likelihood data detection channel. This method requires comparing read back data bits and known data bits to count read back errors.

A publication titled "A WINDOW-MARGIN LIKE PROCEDURE FOR EVALUATING PRML CHANNEL PERFORMANCE", IEEE Transactions on Magnetics, Vol. 31, No.2, March 1995, discloses a method for estimating the BER that requires counting read back errors during the read operation.

As for a test for measuring the performance of a disk drive by generating a histogram, U.S. Pat. No. 5,121,263 discloses such a method. This patent teaches generating a histogram using the following procedures:

1. writing a pattern of binary data bits on the disk of the drive being tested;
2. reading the data bits from the disk;
3. sampling the amplitude of the analog signal at recurring clock intervals;
4. comparing the sampled amplitude to reference amplitude values that are expected to be received for each binary data bit that was recorded on the disk;
5. calculating a difference value for each binary bit that was stored on the disk;
6. storing like magnitude difference values in one of a plurality of registers.

The count content of the plurality of registers provides a histogram depicting the distribution of the like magnitude difference values. The shape of the histogram characterizes the performance of the disk drive and provides a criterion for deciding whether the disk drive being tested meets specifications.

There is a need for an efficient, accurate, and cost effective method for characterizing the performance of a disk drive in a manufacturing environment.

SUMMARY OF THE INVENTION

The invention can be regarded as a disk drive having a normal mode of operation and a built-in self-test mode of operation for producing a sequence of channel metrics $\{\Gamma_n\}$. The disk drive includes a recording surface having a plurality of bit cells; a transducer for reading the plurality of bit cells to produce a noise-corrupted read signal; and a means responsive to the noise-corrupted read signal for generating a sequence of observed samples $\{y_n\}$. The sequence of observed samples $\{yn\}$ forms a sequence of observed-sample subsequences $\{Y_n\}$. Each observed-sample subsequence $Y_n$ has an earliest observed sample and a latest observed sample. The disk drive includes means operative during the built-in self-test mode of operation for providing a sequence of expected samples $\{w_n\}$. The sequence of expected samples forms a sequence of expected-sample subsequences $\{W_n\}$. Each expected-sample subsequence $W_n$ has an earliest expected sample and a latest expected sample. The disk drive includes computation means for computing a sequence of channel metrics $\{\Gamma_n\}$. Each channel metric $\Gamma_n$ is a function of a distance determined from one of the observed-sample subsequences $Y_n$ to the corresponding expected-sample subsequence $W_n$. Each channel metric $\Gamma_n$ is independent of the earliest observed sample in every prior observed-sample subsequence $Y_n$ and the earliest expected sample in every prior expected-sample subsequence $W_n$.

In accordance with a feature of the invention, the disk drive further includes means for computing a mean $\mu_\Gamma$ of the channel metrics $\Gamma_n$; means for computing a standard deviation $\sigma_\Gamma$ of the channel metrics $\Gamma_n$; and means for computing a ratio of the mean $\mu_\Gamma$ to the standard deviation $\sigma_\Gamma$. The ratio corresponds to a signal to noise ratio. According to another feature of the invention, the disk drive includes means for estimating a BER from the ratio $\mu_\Gamma/\sigma_\Gamma$.

This invention can also be regarded as a method for computing a sequence of channel metrics $\{\Gamma_n\}$ for characterizing the performance of a disk drive. This method include the steps of reading a plurality of bit cells stored on a recording surface in the disk drive to produce a noise-corrupted read signal and generating a sequence of observed samples $\{y_n\}$ responsive to the noise-corrupted read signal. The sequence of observed samples $\{y_n\}$ forms a sequence of observed-sample subsequences $\{Y_n\}$. Each observed-sample subsequence $Y_n$ has an earliest observed sample and a latest observed sample. The method includes the step of providing a sequence of expected samples $\{w_n\}$. The sequence of expected samples forms a sequence of expected-sample subsequences $\{W_n\}$. Each expected-sample subsequence $W_n$ has an earliest expected sample and a latest expected sample. The method includes computing a sequence of channel metrics $\{\Gamma_n\}$. Each channel metric $\Gamma_n$ is a function of a distance determined from one of the observed-sample subsequences $Y_n$ to the corresponding expected-sample subsequence $W_n$. Each channel metric $\Gamma_n$ is independent of the earliest observed sample in every prior observed-sample subsequence $Y_n$ and the earliest expected sample in every prior expected-sample subsequence $W_n$.

In accordance with another feature of the invention, the method further includes the steps of computing a mean $\mu_\Gamma$ of the channel metrics $\Gamma_n$; computing a standard deviation $\sigma_\Gamma$ of the channel metrics $\Gamma_n$; and computing a ratio of the mean $\mu_\Gamma$ to the standard deviation $\sigma_\Gamma$. The ratio corresponds to a signal to noise ratio. According to another feature of the invention, the method further includes estimating the BER from the ratio $\mu_\Gamma/\sigma_\Gamma$.

The foregoing and other features of the invention are described in detail below and set forth in the appended claims.

BRIEF DESCRIPTION OF THE DRAWINGS

FIG. 7 is a table that, for a set of conditions defined by a set of expected correct sample subsequences $R_n$ and associated state information $s_n$, relates the conditions to a set of simplified channel metric $\Gamma_n$ equations that each is used for computing the channel metric for the corresponding condition.

DESCRIPTION OF THE PREFERRED EMBODIMENTS

Figure 1:
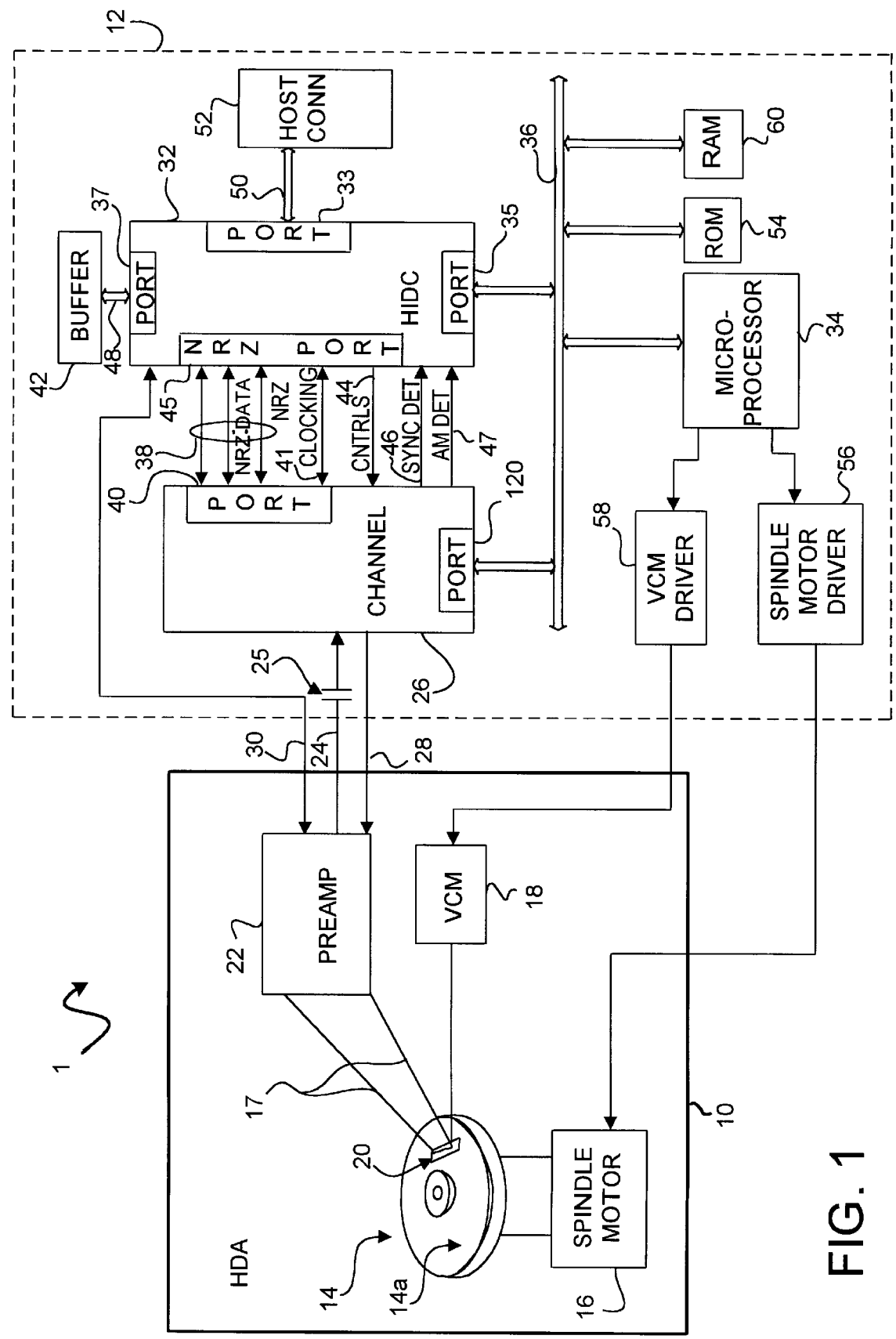
FIG. 1 is a block diagram of a disk drive embodying the invention.

Referring to FIG. 1, a disk drive 1 in accordance with a preferred embodiment of the invention includes a head disk assembly ("HDA 10") and a printed circuit board assembly ("PCBA 12"). HDA 10 includes a disk 14 having a recording surface 14a for storing a plurality of bit cells, a transducer 20, and a preamp 22 coupled between transducer 20 and PCBA 12. HDA 10 also includes a spindle motor 16 and a voice coil motor ("VCM 18"). PCBA 12 includes a host interface and disk controller ("HIDC 32") and a channel 26. Channel 26 participates in the transfer of data bits between HIDC 32 and HDA 10. PCBA 12 also includes a microprocessor 34, a data buffer 42, a read only memory ("ROM 54"), a writeable random access memory ("RAM 60"), a spindle motor driver 56, and a VCM driver 58.

The disclosure of commonly owned co-pending U.S. patent application Ser. No. 08/815,352, filed Mar. 11, 1997, entitled DISK DRIVE EMPLOYING READ ERROR TOLERANT SYNC MARK DETECTION, is incorporated herein by reference (the "352 application"). A description of the elements shown in FIG. 1 is set forth in the '352 application.

Disk drive 1 has a normal mode of operation and a built-in self-test (BIST) mode of operation. The BIST mode of operation has (a) a test write mode of operation and (b) a test read mode of operation. Alternatively, the BIST mode of operation may include the test read mode of operation only.

The BIST mode of operation can be used for estimating the BER of disk drive 1 and locating defective sites on recording surface 14a of disk 14. The BIST mode of operation can also be used for tuning electronic components in disk drive 1 to improve the BER.

During the BIST mode of operation, channel 26 computes a sequence of channel metrics $\{\Gamma_n\}$ and accumulates a sum of the channel metrics $\Gamma_n$ ($\Sigma \Gamma_n$) and a sum of the squares of the channel metrics $\Gamma_n$ ($\Sigma \Gamma_n^2$). Channel 26 compares each channel metric $\Gamma_n$ to a channel metric $\Gamma_n$ defect threshold. If the channel metric $\Gamma_n$ is below the channel metric $\Gamma_n$ defect threshold, channel 26 generates a defect discovery signal indicating a defective site. The defect discovery signal can be transmitted from channel 26 to HIDC 32 using a channel data bus 38. The sequence of channel metrics $\{\Gamma_n\}$ can be used for performing a bit-by-bit defect discovery.

Microprocessor 34 receives the accumulated channel metrics $\Gamma_n$ from channel 26 and computes a mean $\mu_\Gamma$ and a standard deviation $\sigma_\Gamma$ of the channel metrics $\Gamma_n$. Microprocessor 34 also computes a ratio of the mean $\mu_\Gamma$ to the standard deviation $\sigma_\Gamma$, the ratio corresponding to a signal to noise ratio.

HIDC 32 receives and transmits the ratio ($\mu_\Gamma/\sigma_\Gamma$) from microprocessor 34 to the host computer (not shown). Alternatively, microprocessor 34 estimates a BER from the ratio ($\mu_\Gamma/\sigma_\Gamma$) For example, the BER can be estimated from Q ($\mu_\Gamma/\sigma_\Gamma$), where Q is the Gaussian Q function. HIDC 32 receives and transmits the BER from microprocessor 34 to the host computer (not shown). HIDC 32 receives the defect discovery signal from channel 26 and records the defective site in a defect list.

Figure 2:
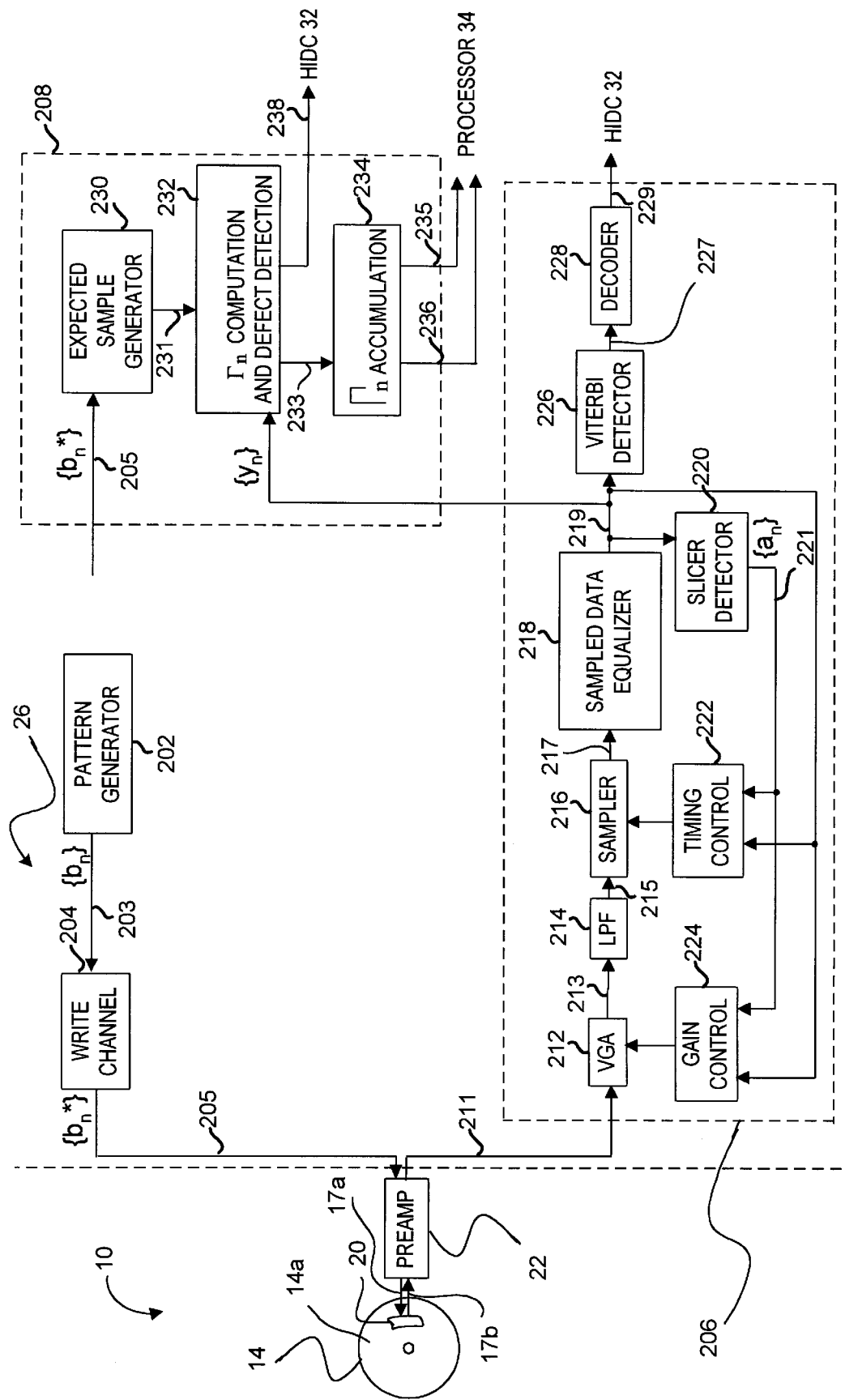
FIG. 2 is a block diagram of the HDA and channel components in the disk drive of FIG. 1; the channel includes a built-in self-test system for computing a sequence of channel metrics $\{\Gamma_n\}$, and for accumulating a sum of the channel metrics $\Gamma_n$ ($\Sigma\Gamma_n$) and a sum of the squares of the channel metrics $\Gamma_n$ ($\Sigma\Gamma_n^2$).

Referring to FIG. 2, channel 26 of FIG. 1 includes a pattern generator 202, a write channel 204, a read channel 206, and a BIST mode test system 208. Read channel 206 includes a variable gain amplifier ("VGA 212"), a low pass filter ("LPF 214"), a sampler 216, a sampled data equalizer 218, a slicer detector 220, a timing control 222, a gain control 224, a Viterbi detector 226, and a decoder 228. Write channel 204 includes an encoder and a precoder (not shown).

Pattern generator 202 is a data source suitable for providing a data signal 203 representing a test data sequence $\{b_n\}$ to write channel 204. As used in herein, for a sequence of elements having a lower case letter and a subscript n, the subscript n represents the $n^{th}$ element in the sequence of elements.

For example, pattern generator 202 is a PN signal generator that provides a pseudo-random test data sequence $\{b_n\}$. The disclosure of commonly owned co-pending U.S. patent application Ser. No. 08/870,515, now U.S. Pat. No. 6,208,477, filed Jun. 6, 1997, entitled HARD DISK DRIVE HAVING A BUILT-IN SELF-TEST FOR MEASURING READBACK SIGNAL DISTORTION, is incorporated herein by reference (the "515 application"). A description of a PN signal generator is set forth in the '515 application.

Alternatively, pattern generator 202 can be a data source that is external to channel 26. For example, pattern generator 202 can be an external memory unit for providing a data signal 203 representing the test data sequence $\{b_n\}$. The test data sequence $\{b_n\}$ can be a predetermined test data sequence. Pattern generator 202 can also be a host computer (user data) or a servo track writer (servo data) that provides a data signal 203 representing a non-test data sequence $\{b_n\}$.

BIST mode test system 208 includes an expected sample generator 230, a channel metric $\Gamma_n$ computation and defect detection system 232 ("$\Gamma_n$ computation system 232"), and a channel metric $\Gamma_n$ accumulation system 234. Alternatively, BIST mode system 208 includes channel metric $\Gamma_n$ accumulation system 234 only. In this alternate embodiment, Viterbi detector 226 computes and transmits the sequence of channel metrics $\{\Gamma_n\}$ to channel metric $\Gamma_n$ accumulation system 234. Viterbi detector 226 can include a defect detection system for generating a defect discovery signal indicating a defective site for channel metrics $\Gamma_n$ that do not meet a channel metric $\Gamma_n$ defect threshold.

Write Mode of Operation

During the test write mode of operation, write channel 204 receives data signal 203 representing the test data sequence $\{b_n\}$ from pattern generator 202 and produces a data signal 205 representing a test data sequence $\{b^*_n\}$. Alternatively, during the normal write mode of operation, write channel 204 receives a data signal 203 representing the non-test data sequence $\{b_n\}$ from pattern generator 202 and produces a data signal 205 representing a non-test data sequence $\{b^*_n\}$.

Data signal 205 has a sequence of state information $\{s_n\}$ that corresponds to the test data sequence $\{b^*_n\}$. The precoder in write channel 204 is suitable for generating data signal 205 representing the test data sequence $\{b^*_n\}$.

According to another embodiment, write channel 204 does not includes the encoder and the precoder. Write channel 204 receives data signal 203 representing the test data sequence $\{b_n\}$ from pattern generator 202 and produces a data signal 205 without encoding and precoding signal processing.

Preamp 22 receives data signal 205 from write channel 204 and generates write signal 17a corresponding to the test data sequence $\{b^*_n\}$. Transducer 20 receives write signal 17a and records the test data sequence $\{b^*_n\}$ as a plurality of bit cells on recording surface 14a.

Read Mode of Operation

During the test read mode of operation, transducer 20 reads the plurality of bit cells stored on recording surface 14a to produce a noise-corrupted analog read signal 17b. Preamp 22 receives analog read signal 17b and produces a noise-corrupted analog read signal 211. VGA 212 receives analog read signal 211 and under control of gain control 224 produces an analog read signal 213 that has a substantially constant amplitude. LPF 214 receives analog read signal 213 and generates analog read signal 215 having an improved signal to noise ratio. Sampler 216 receives analog read signal 215 and in response generates sampled signal 217. Sampled data equalizer 218 receives sampled signal 217 and generates an equalized sampled signal 219 representing a sequence of observed samples $\{y_n\}$.

Slicer detector 220 receives equalized sampled signal 219 and in response generates a slicer sampled signal 221 representing a sequence of slicer samples $\{a_n\}$. Slicer sampled signal 221 is a coarsely quantized estimate of equalized sampled signal 219. For example, slicer sampled signal 221 for a PR4ML channel has one of three possible slicer sample values (+1,0, −1). If the equalized sample value for equalized sampled signal 219 is more positive than a first predetermined factor (e.g., ½) of the target value +1, the slicer sample value is +1. If the equalized sample value for equalized sampled signal 219 is more negative than a second predetermined factor (e.g., ½) of the target value −1, the slicer sample value is −1. If the equalized sample value for equalized sampled signal 219 is between (a) the first predetermined factor (e.g., ½) of the target value +1 and (b) the second predetermined factor (e.g., ½) of the target value −1, then the slicer sample value is 0.

Viterbi detector 226 receives equalized sampled signal 219 representing the sequence of observed samples $\{y_n\}$ and generates a data signal 227 representing a data sequence $\{b_n\}$. Decoder 228 receives data signal 227 and generates a decoded data signal 229.

Expected sample generator 230 receives data signal 205 representing the test data sequence $\{b^*_n\}$ that was supplied to preamp 22 during the test write mode of operation. Expected sample generator 230 generates an expected sample signal 231 representing a sequence of expected samples $\{w_n\}$. Expected sample generator 230 includes a finite state channel model (not shown) that receives state information $\{s_n\}$ associated with the test data sequence $\{b^*_n\}$ to produce expected sample signal 231. For example, the finite state channel model for disk drive 1 having a PR4ML signal processing system is defined by the transfer polynomial $(1-D^2)$.

Alternatively, expected sample generator 230 receives signal 203 representing the test data sequence $\{b_n\}$ that was supplied to write channel 204 during the test write mode of operation. In this alternative embodiment, expected sample generator 230 includes an encoder, a precoder and a finite state channel model. The encoder and precoder generate the test data sequence $\{b^*_n\}$ corresponding to data signal 205. The finite state channel model receives state information $\{s_n\}$ associated with the test data sequence $\{b^*_n\}$ and generates signal 231 representing the sequence of expected samples $\{w_n\}$.

According to alternate embodiment, the BIST mode of operation includes the test read mode of operation only. Expected sample generator 230 receives signal 221 representing the sequence of slicer samples $\{a_n\}$ and generates signal 231 representing a sequence of expected samples $\{w_n\}$. In this alternate embodiment, the sequence of slicer samples $\{a_n\}$ corresponds to the non-test data sequence $\{b^*_n\}$. Expected sample generator 230 includes a state machine (not shown) for defining state information $\{s_n\}$ associated with the non-test data sequence $\{b^*_n\}$.

State information $\{s_n\}$ associated with the test data sequence $\{b^*_n\}$ defines the sequence of expected correct samples $\{\Gamma r_n\}$. According to an alternate embodiment, state information $\{s_n\}$ associated with the non-test data sequence $\{b^*_n\}$ defines the sequence of expected correct samples $\{\Gamma r_n\}$.

The sequence of expected error samples $\{r'_n\}$ is defined by the state information $\{s_n\}$ associated with the sequence of expected correct samples $\{\Gamma r_n\}$. The sequence of expected samples $\{w_n\}$ is defined by the sequence of expected correct samples $\{\Gamma r_n\}$ and the sequence of expected error samples $\{r'_n\}$.

Channel metric $\Gamma_n$ computation system 232 receives equalized sampled signal 219 representing the sequence of observed samples $\{y_n\}$ and signal 231 representing the sequence of expected samples $\{w_n\}$. Channel metric $\Gamma_n$ computation system 232 generates a signal 233 representing a sequence of channel metrics $\{\Gamma_n\}$.

The sequence of observed samples $\{y_n\}$ forms a sequence of observed-sample subsequences $\{Y_n\}$. Each observed-sample subsequence $Y_n$ has an earliest observed sample and a latest observed sample. The sequence of expected samples $\{w_n\}$ forms a sequence of expected-sample subsequences $\{W_n\}$. Each expected-sample subsequence $W_n$ has an earliest expected sample and a latest expected sample. As used herein, for a sequence of subsequences having an upper case letter and a subscript n, the subscript n represents the $n^{th}$ subsequence in the sequence of subsequences.

Each channel metric $\Gamma_n$ is a function of a distance determined from one of the observed-sample subsequences $Y_n$ to the corresponding expected-sample subsequence $W_n$. Each channel metric $\Gamma_n$ is independent of the earliest observed sample in every prior observed-sample subsequence $Y_n$ and the earliest expected sample in every prior expected-sample subsequence $W_n$.

The distance determined from the observed-sample subsequences $Y_n$ to the corresponding expected-sample subsequence $W_n$ corresponds to a space distance, such as a Euclidean or Hamming distance. Alternatively, the distance can be an absolute value of the difference between the observed-sample subsequence $Y_n$ and expected-sample subsequence $W_n$.

Channel metric $\Gamma_n$ computation system 232 compares signal 233 representing the channel metric $\Gamma_n$ to a channel metric $\Gamma_n$ defect threshold. If signal 233 (channel metric $\Gamma_n$)

is below the channel metric $\Gamma_n$ defect threshold, channel metric $\Gamma_n$ computation system 232 generates a defect discovery signal 238 indicating a defective site associated with the observed sample $y_n$.

Channel metric $\Gamma_n$ accumulation system 234 receives signal 233 and generates a signal 235 representing a sum of the channel metrics $\Gamma_n$ ($\Sigma\Gamma_n$). Channel metric $\Gamma_n$ accumulation system 234 also generates a signal 236 representing a sum of the squares of the channel metrics $\Gamma_n$ ($\Sigma\Gamma_n^2$).

Microprocessor 34 receives signal 235 (representing the sum of the channel metrics $\Gamma_n$) and signal 236 (representing the sum of the squares of the channel metrics $\Gamma_n$) to compute the mean $\mu_\Gamma$ and the standard deviation $\sigma_\Gamma$. Microprocessor 34 also computes the ratio of the mean $\mu_\Gamma$ to the standard deviation $\sigma_\Gamma$. The ratio represents the signal to noise ratio. According to an alternate embodiment, microprocessor 34 estimates a BER from the ratio ($\mu_\Gamma/\sigma_\Gamma$)

HIDC 32 receives and transmits the ratio ($\mu_\Gamma/\sigma_\Gamma$) from microprocessor 34 to the host computer (not shown). Alternatively, HIDC 32 receives and transmits the BER from microprocessor 34 to the host computer (not shown). HIDC 32 receives defect discovery signal 238 and records the defective site in the defect list.

Figure 3:
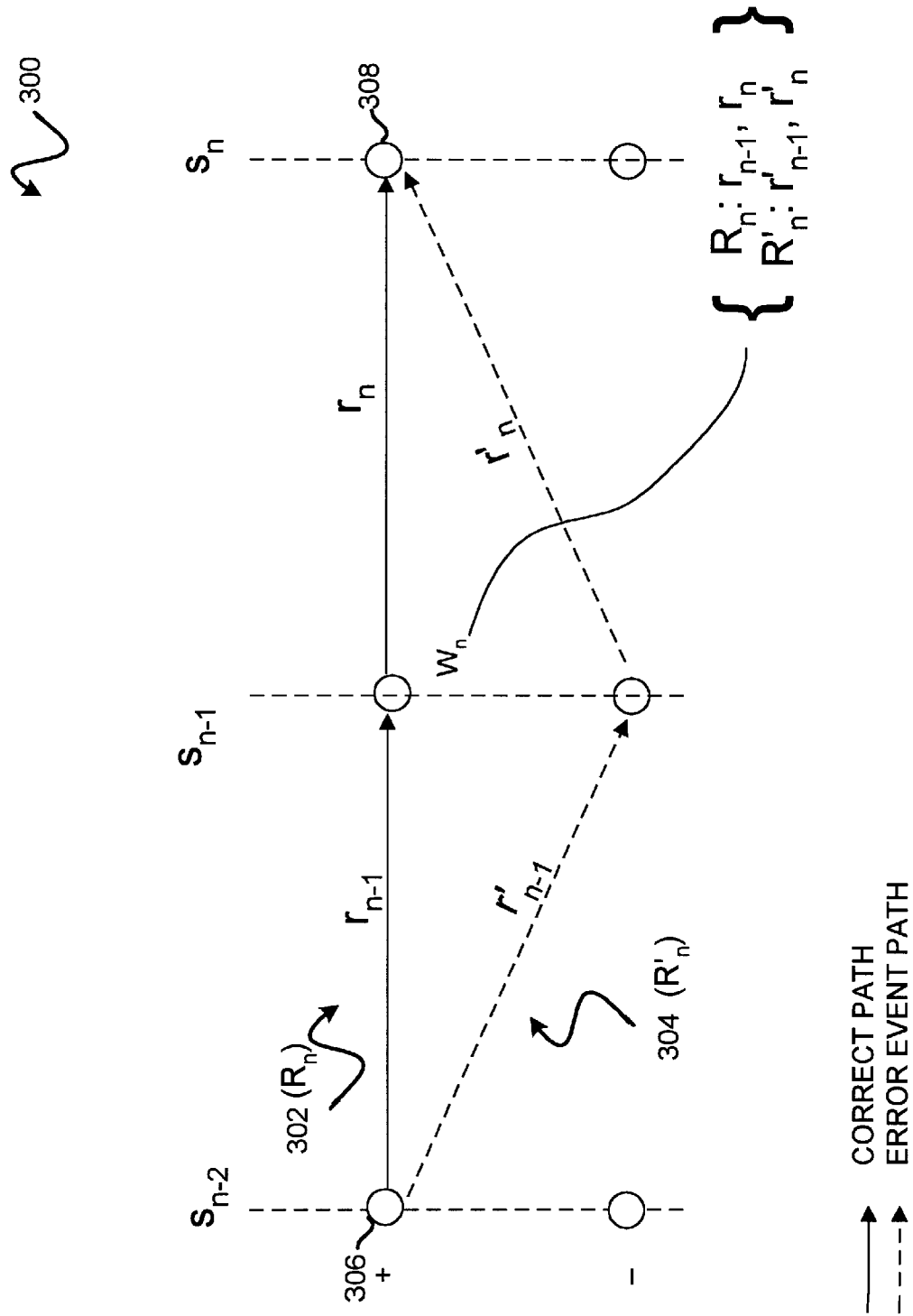
FIG. 3 is a trellis diagram showing a trellis path route corresponding to an expected-sample subsequence $W_n$, the expected-sample subsequence $W_n$ being defined by an expected correct-sample subsequence $R_n$ and an expected error-sample subsequence $R'_n$.

Referring to FIG. 3, trellis diagram path route 300 corresponds to an expected-sample subsequence $W_n$ for disk drive 1 (FIG. 1) employing a sampled data signal processing system tuned to a (1-D) channel response. This illustration is suitable for each of the (1-D) interleaves in a PR4ML signal processing system.

The expected-sample subsequence $W_n$ is defined by an expected correct-sample subsequence $R_n$ and an expected error-sample subsequence $R'_n$. As previously mentioned, the sequence of expected samples $\{w_n\}$ is defined by the sequence of expected correct samples $\{r_n\}$ and the sequence of expected error samples $\{r'_n\}$. The sequence of expected correct samples $\{r_n\}$ forms the sequence of expected correct-sample subsequences $\{R_n\}$. Each expected correct-sample subsequence $R_n$ has an earliest expected correct sample and a latest expected correct-sample. The sequence of expected error samples $\{r'_n\}$ forms the sequence of expected error-sample subsequences $\{R'_n\}$. Each expected error-sample subsequence $R'_n$ has an earliest expected error sample and a latest expected error sample.

Path route 300 has a correct path 302 corresponding to the expected correct-sample subsequence $R_n$ and an error event path 304 corresponding to the expected error-sample subsequence $R'_n$. Correct path 302 begins from a beginning state $s_{n-2}$ 306 and ends at an ending state $s_n$ 308. Error event path 304 is a minimum distance error event path that begins from the beginning state $s_{n-2}$ 306 and ends at the ending state 308 $s_n$.

Path route 300 has two time steps between the beginning state $s_{n-2}$ 306 and the ending state 308 $s_n$. Alternatively, path route 300 has more than two times steps between the beginning state 306 and the ending state 308. The number of time steps corresponds to the number of samples between the beginning state 306 and ending state 308.

Example

The following is an example of disk drive 1 (FIG. 1) employing a sampled data signal processing system tuned to a (1-D) channel response. This example is also suitable for each of the (1-D) interleaves in a PR4ML signal processing system. The mean $\mu_\Gamma$ of the channel metrics $\{\Gamma_n\}$ is computed for each interleave and then combined together. The standard deviation of the channel metrics $\{\Gamma_n\}$ is also computed for each interleave and then combined together.

During the test write mode of operation, write channel 204 receives a test data sequence $b_0=1$, $b_1=0$, $b_2=0$, $b_3=0$, $b_4=0$, $b_5=1$, and $b_6=0$ and generates a test data sequence $b^*_{initial}=0$, $b^*_0=1$, $b^*_1=1$, $b^*_2=1$, $b^*_3=1$, $b^*_4=1$, $b^*_5=0$, and $b^*_6=0$. Transducer 20 receives state information $s_{initial}=-$, $s_0=+$, $s_1=+$, $s_2=+$, $s_3=+$, $s_4=+$, $s_5=-$, and $s_6=-$ associated with the test data sequence $\{b^*_n\}$ and records the test data sequence $\{b^*_n\}$ as a plurality of bit cells on recording surface 14a of disk 14.

Figure 4A:
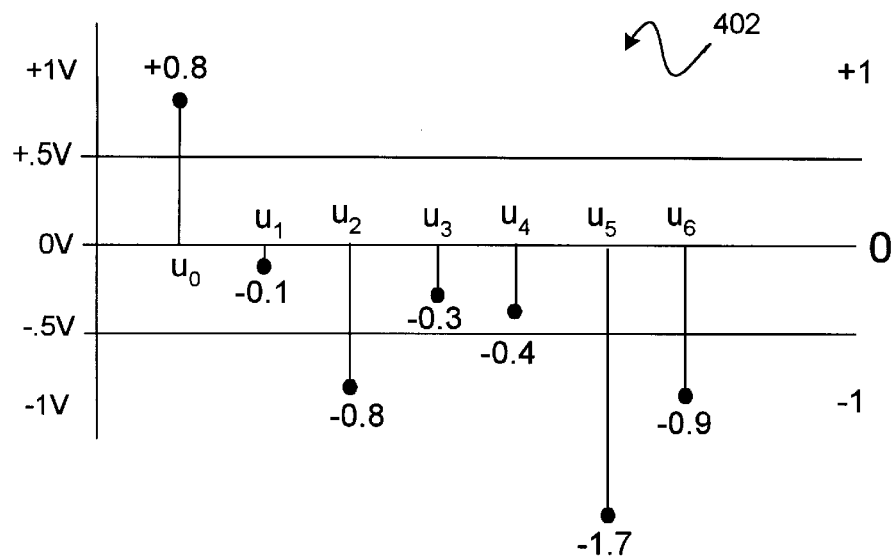
FIG. 4A is a sequence diagram for a sampled signal produced by sampling and shows a sequence of noise corrupted unequalized samples $u_0, \ldots u_6$.

During the test read mode of operation, transducer 20 reads the plurality of bit cells stored on recording surface 14a to produce a noise-corrupted read signal. Sampler 216 generates a noise corrupted sequence of unequalized samples $u_0=+0.8$, $u_1=-0.1$, $u_2=-0.8$, $u_3=-0.3$, $u_4=-0.4$, $u_5=-1.7$, and $u_6=-0.9$ responsive to the noise-corrupted read signal. Referring to FIG. 4A, sequence diagram 402 shows the noise corrupted sequence of unequalized samples $u_0$, $u_1$, $u_2$, $u_3$, $u_4$, $u_5$, and $u_6$.

Figure 4B:
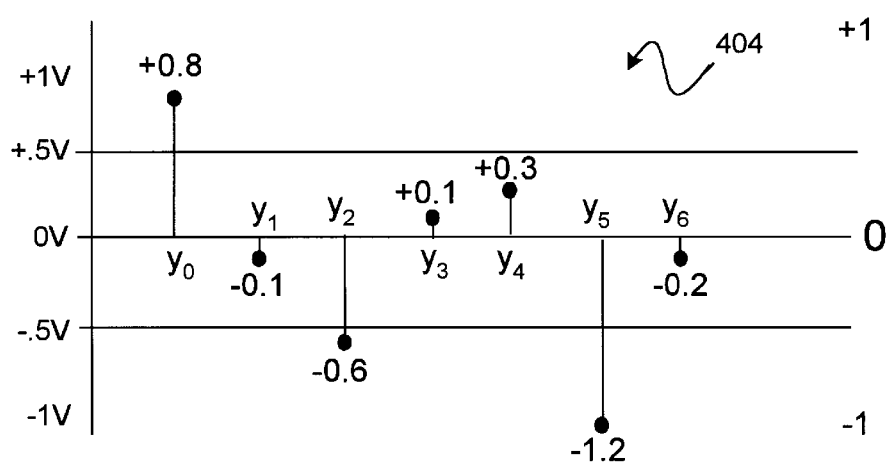
FIG. 4B is a sequence diagram for a sampled signal that defines a sequence of noise corrupted observed samples $y_0, \ldots y_6$.

Sampled data equalizer 218 generates a sequence of observed samples $y_0=+0.8$, $y_1=-0.1$, $y_2=-0.6$, $y_3=+0.1$, $y_4=+0.3$, $y_5=-1.2$, and $y_6=-0.2$ responsive to the noise corrupted sequence of unequalized samples. Referring to FIG. 4B, sequence diagram 404 shows the sequence of observed samples $y_0$, $y_1$, $y_2$, $y_3$, $y_4$, $y_5$ and $y_6$. The sequence of observed samples $\{y_n\}$ includes noise which contributes to sample values deviating from their expected correct values.

The sequence of observed samples $\{y_n\}$ forms a sequence of observed-sample subsequences $Y_n$: $Y_1=y_0,y_1$; $Y_2=y_1,y_2$; $Y_3=y_2,y_3$; $Y_4=y_3,y_4$; $Y_5=y_4,y_5$; and $Y_6=y_5,y_6$. Each observed-sample subsequence $Y_n$ has an earliest observed sample and a latest observed sample.

Figure 4C:
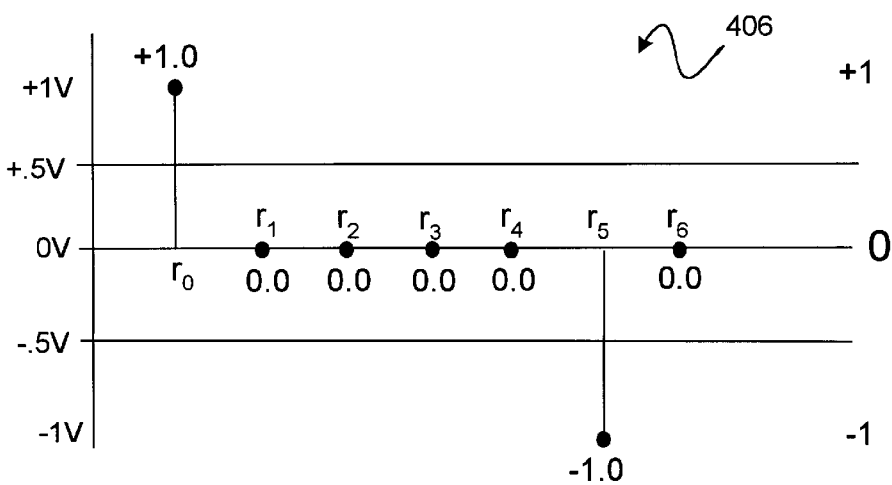
FIG. 4C is a sequence diagram for a sampled signal that defines a noiseless sequence of expected correct samples $r_0, \ldots, r_6$.

Expected sample generator 230 receives the test data sequence $b^*_{initial}=0$, $b^*_0=1$, $b^*_1=1$, $b^*_2=1$, $b^*_3=1$, $b^*_4=1$, $b^*_5=0$, and $b^*_6=0$ and provides a corresponding sequence of expected correct samples $r_0=+1.0$, $r_1=0.0$, $r_2=0.0$, $r_3=0.0$, $r_4=0.0$, $r_5=-1.0$, and $r_6=0.0$. State information $\{s_n\}$ associated with the test data sequence $\{b^*_n\}$ defines the sequence of expected correct samples $\{r_n\}$. Referring to FIG. 4C, sequence diagram 406 shows the sequence of expected correct samples $r_0$, $r_1$, $r_2$, $r_3$, $r_4$, $r_5$, and $r_6$. The sequence of expected correct samples $\{r_n\}$ represents noiseless samples having expected values.

The sequence of expected correct samples $\{\Gamma r_n\}$ forms a sequence of expected correct-sample subsequences $R_n$: $R_1=r_0,r_1$; $R_2=r_1,r_2$; $R_3=r_2,r_3$; $R_4=r_3,r_4$; $R_5=r_4,r_5$; and $R_6=r_5,r_6$. Each expected correct-sample subsequence $R_n$ has an earliest expected correct sample and a latest expected correct sample. The sequence of expected correct-sample subsequences $R_n$ defines a sequence of expected error-sample subsequences $R'_n$: $R'_1=r'_0,r'_1$; $R'_2=r'_1,r'_2$; $R'_3=r'_2,r'_3$; $R'_4=r'_3,r'_4$; $R'_5=r'_4,r'_5$; and $R'_6=r'_5,r'_6$. Each expected error-sample subsequence $R'_n$ has an earliest expected error sample and a latest expected error sample.

Figure 5A:
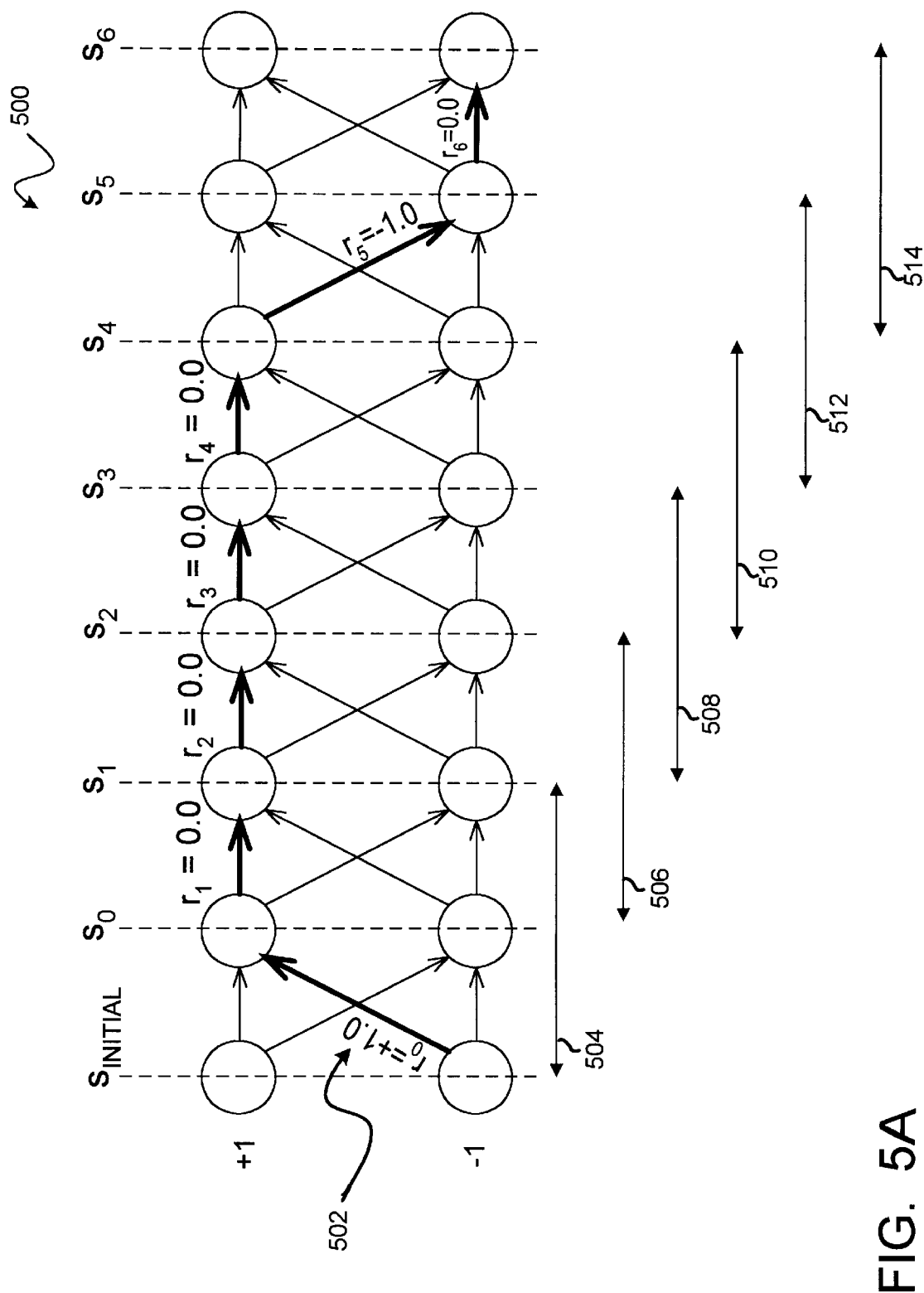
FIG. 5A is a trellis diagram showing an expected correct trellis path corresponding to the sequence of expected correct samples $r_0, \ldots, r_6$ in FIG. 4C.

Referring to FIG. 5A, trellis diagram 500 includes an expected correct trellis path 502 corresponding to the sequence of expected correct samples $r_0=+1.0$, $r_1=0.0$, $r_2=0.0$, $r_3=0.0$, $r_4=0.0$, $r_5=-1.0$, and $r_6=0.0$. Expected correct trellis path 502 defines a sequence of six overlapping path routes 504, 506, 508, 510, 512, and 514. Each path route corresponds to an expected-sample subsequence $W_n$.

Figure 5B:
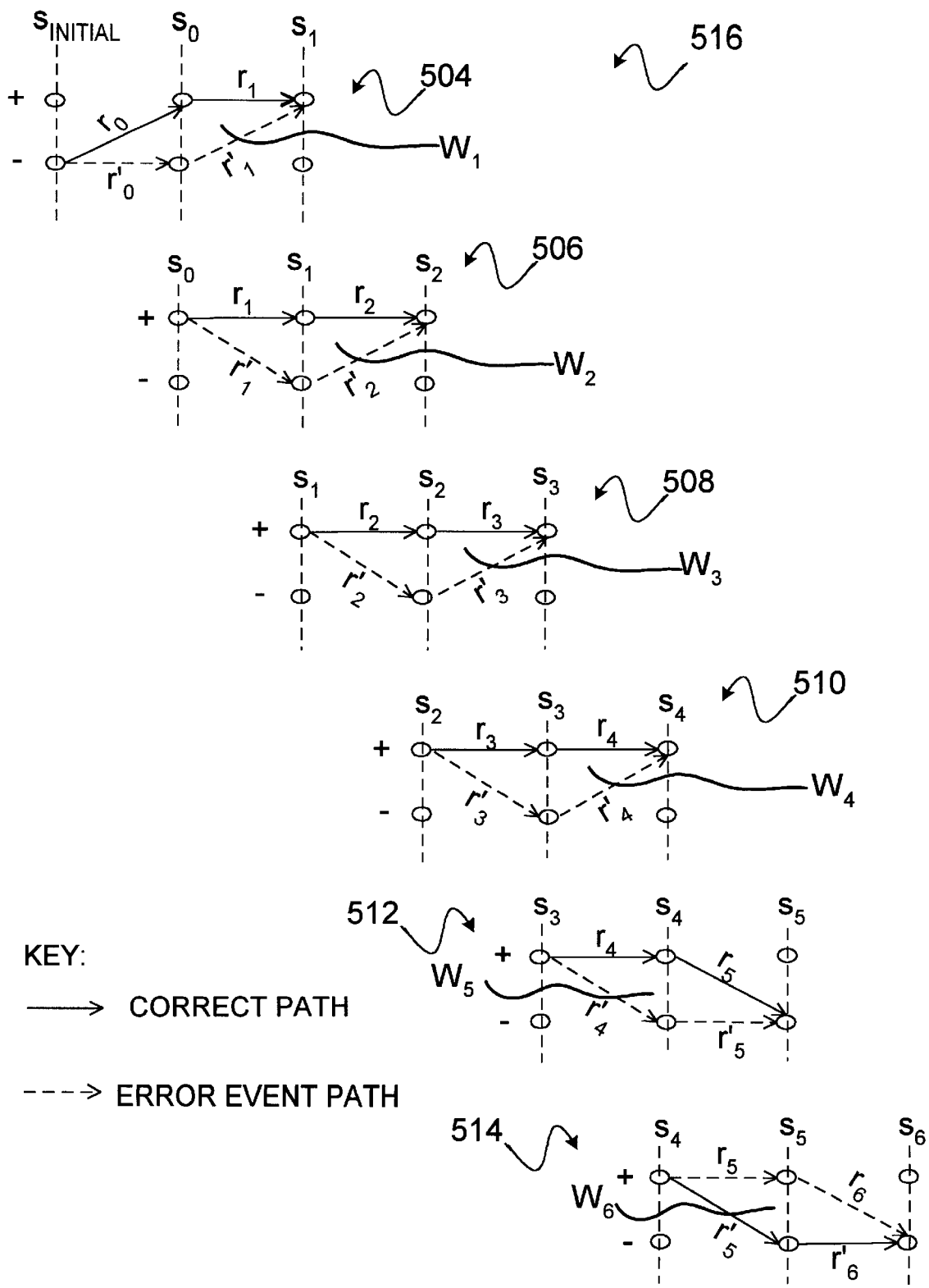
FIG. 5B is a set of six overlapping trellis diagrams that show a sequence of trellis path routes corresponding to a sequence of expected-sample subsequences $W_1$, $W_2$, $W_3$, $W_4$, $W_5$, and $W_6$.

Referring to FIG. 5B, trellis diagram 516 shows the sequence of overlapping path routes 504, 506, 508, 510, 512, and 514 corresponding to a sequence of expected-sample subsequences $W_n$: $W_1$, $W_2$, $W_3$, $W_4$, $W_5$ and $W_6$. As previously mentioned, each expected-sample subsequence $W_n$ is defined by an expected correct-sample subsequence $R_n$ and an expected error-sample subsequence $R'_n$. As shown in trellis diagram 516, each path route includes a correct path (solid line) corresponding to an expected correct-sample subsequence $R_n$: $r_{n-1},r_n$ and an error event path (dotted line) corresponding to an expected error-sample subsequence $R'_n$: $r'_{n-1},r'_n$.

Referring to FIGS. 5A and 5B, path route 504 corresponds to the expected-sample subsequence $W_1$. The expected-channel metric $\Gamma_n$ equation $[y_{n-1}-r'_{n-1})^2+(y_n-r'_n)^2]-[(y_{n-1}-r_{n-1})^2+(y_n-r_n)_2]$.

TABLE 2

|  | initial state | sample n | | | | | | |
|---|---|---|---|---|---|---|---|---|
|  |  | n = 0 | n = 1 | n = 2 | n = 3 | n = 4 | n = 5 | n = 6 |
| test data sequence $\{b_n\}$ |  | 1 | 0 | 0 | 0 | 0 | 1 | 0 |
| test data sequence $\{b*_n\}$ | 0 | 1 | 1 | 1 | 1 | 1 | 0 | 0 |
| observed sample sequence $\{y_n\}$ |  | +0.8 | −0.1 | −0.6 | +0.1 | +0.3 | −1.2 | −0.2 |
| expected sample sequence $\{r_n\}$ |  | +1.0 | 0.0 | 0.0 | 0.0 | 0.0 | −1.0 | 0.0 |
| expected state information $\{s_n\}$ | − | + | + | + | + | + | − | − |
| channel metrics $\{\Gamma_n\}$ |  |  | 1.80 | 3.00 | .60 | 1.60 | 3.00 | 5.40 |
| Viterbi state metric (+1 state) |  | .04 | .05 | .41 | .42 | .51 | 1.95 | 1.99 |
| Viterbi state metric (−1 state) | 0 | .64 | .65 | .21 | .22 | .31 | .55 | .59 | sample subsequence $W_1$ is defined by expected correct-sample subsequence $R_1$: $r_0$=+1.0, $r_1$=0.0, and expected error-sample subsequence $R'_1$: $r'_0$=0.0, $r'_1$=+1.0. Path route 506 corresponds to expected-sample subsequence $W_2$. The expected-sample subsequence $W_2$ is defined by expected correct-sample subsequence $R_2$: $r_1$=0.0, $r_2$=0.0, and expected error-sample subsequence $R'_2$: $r'_1$=−1.0, $r'_2$=+1.0. Path route 508 corresponds to expected-sample subsequence $W_3$. The expected-sample subsequence $W_3$ is defined by expected correct-sample subsequence $R_3$: $r_2$0.0, $r_3$=0.0, and expected error-sample subsequence $R'_3$: $r'_2$=−1.0, $r'_3$=+1.0. Path route 510 corresponds to expected-sample subsequence $W_4$. The expected-sample subsequence $W_4$ is defined by expected correct-sample subsequence $R_4$: $r_3$=0.0, $r_4$=0.0, and expected error-sample subsequence $R'_4$: $r'_3$=−1.0, $r'_4$=+1.0. Path route 512 corresponds to expected-sample subsequence $W_5$. The expected-sample subsequence $W_5$ is defined by expected correct-sample subsequence $R_5$: $r_4$=0.0, $r_5$=−1.0, and expected error-sample subsequence $R'_5$: $r'_4$=−1.0, $r'_5$=0.0. Path route 514 corresponds to expected-sample subsequence $W_6$. The expected-sample subsequence $W_6$ is defined by expected correct-sample subsequence $R_6$: $r_5$=−1.0, $r_6$=0.0, and expected error-sample subsequence $R'_6$: $r'_5$=0.0, $r'_6$=−1.0.

Table 1 shows sample values for the sequence of observed-sample subsequences $\{Y_n: y_{n-1},y_n\}$ and the sequence of expected-sample subsequences $\{W_n\}$, wherein the sequence of expected-sample subsequences $\{W_n\}$ is defined by the sequence of expected correct-sample subsequences $\{R_n: r_{n-1},r_n\}$ and the sequence of expected error-sample subsequences $(R'_n: r'_{n-1},r'_n)$.

TABLE 1

| sub-sequence | observed-sample subsequence $Y_n$ | expected-sample subsequence $W_n$ | |
|---|---|---|---|
|  | $Y_n$: $y_{n-1},y_n$ | $R_n$: $r_{n-1},r_n$ | $R'_n$: $r'_{n-1},r'_n$ |
| n = 1 | $y_0$ = +0.8, $y_1$ = −0.1 | $r_0$ = +1.0, $r_1$ = 0.0 | $r'_0$ = 0.0, $r'_1$ = +1.0 |
| n = 2 | $y_1$ = −0.1, $y_2$ = −0.6 | $r_1$ = 0.0, $r_2$ = 0.0 | $r'_1$ = −1.0, $r'_2$ = +1.0 |
| n = 3 | $y_2$ = −0.6, $y_3$ = +0.1 | $r_2$ = 0.0, $r_3$ = 0.0 | $r'_2$ = −1.0, $r'_3$ = +1.0 |
| n = 4 | $y_3$ = +0.1, $y_4$ = +0.3 | $r_3$ = 0.0, $r_4$ = 0.0 | $r'_3$ = −1.0, $r'_4$ = +1.0 |
| n = 5 | $y_4$ = +0.3, $y_5$ = −1.2 | $r_4$ = 0.0, $r_5$ = −1.0 | $r'_4$ = −1.0, $r'_5$ = 0.0 |
| n = 6 | $y_5$ = −1.2, $y_6$ = −0.2 | $r_5$ = 1.0, $r_6$ = 0.0 | $r'_5$ = 0.0, $r'_6$ = −1.0 |

The channel metric $\Gamma_n$ can be determined from the equation $[(y_{n-1}-r'_{n-1})^2+(y_n-r'_n)^2]-[(y_{n-1}-r_{n-1})^2+(y_n-r_n)^2]$. The channel metric equation includes a channel metric component $\Gamma_{R'n}$ corresponding to $[(y_{n-1}-r'_{n-1})^2+(y_n-r'_n)^2]$ and a channel metric component $\Gamma_{Rn}$ corresponding to $[(y_{n-1}-r_{n-1})^2+(y_n-r_n)^2]$. Alternatively, the channel metric $\Gamma_n$ can be determined from other simplified equations derived from the Channel metric $\Gamma_n$ computation system 232 receives one of the observed-sample subsequences $Y_n$: $y_{n-1},y_n$, the corresponding expected correct-sample subsequence $R_n$: $r_{n-1}, r_n$, and the corresponding expected correct-sample subsequence $R'_n$: $r'_{n-1},r'_n$ to compute the channel metric $\Gamma_n$. Alternatively, channel metric $\Gamma_n$ computation system 232 receives one of the observed-sample subsequences $Y_n$: $y_{n-1}$, $y_n$ the corresponding expected correct-sample subsequence $R_n$: $r_{n-1},r_n$, and the corresponding state information $s_n$ associated with the expected correct-sample subsequence $R_n$.

Referring to tables 1 and 2, channel metric $\Gamma_1$ (table 2, at column n=1) is 1.80 and represents a distance determined from the expected-observed sample subsequence $Y_1$: $y_0$=+0.8,$y_1$=−0.1 to the corresponding expected correct-sample subsequence $W_1$. Channel metric $\Gamma_2$ (at column n=2) is 3.00 and represents a distance determined from the expected-observed sample subsequence $Y_2$: $y_1$=−0.1,$y_2$=−0.6 to the corresponding expected correct-sample subsequence $W_2$. Channel metric $\Gamma_3$ (at column n=3) is 0.60 and represents a distance determined from the expected-observed sample subsequence $Y_3$: $y_2$=−0.6,$y_3$=+0.1 to the corresponding expected correct-sample subsequence $W_3$. Channel metric $\Gamma_4$ (at column n=4) is 1.60 and represents a distance determined from the expected-observed sample subsequence $Y_4$: $y_3$=+0.1, $y_4$=+0.3 to the corresponding expected correct-sample subsequence $W_4$. Channel metric $\Gamma_5$ (at column n=5) is 3.00 and represents a distance determined from the expected-observed sample subsequence $Y_5$: $y_4$=+0.3,$y_5$=−1.2 to the corresponding expected correct-sample subsequence $W_5$. Channel metric $\Gamma_6$ (at column n=6) is 5.40 and represents a distance determined from the expected-observed sample subsequence $Y_6$: $y_5$=−1.2,$y_6$=−0.2 to the corresponding expected correct-sample subsequence $W_6$.

Figure 6:
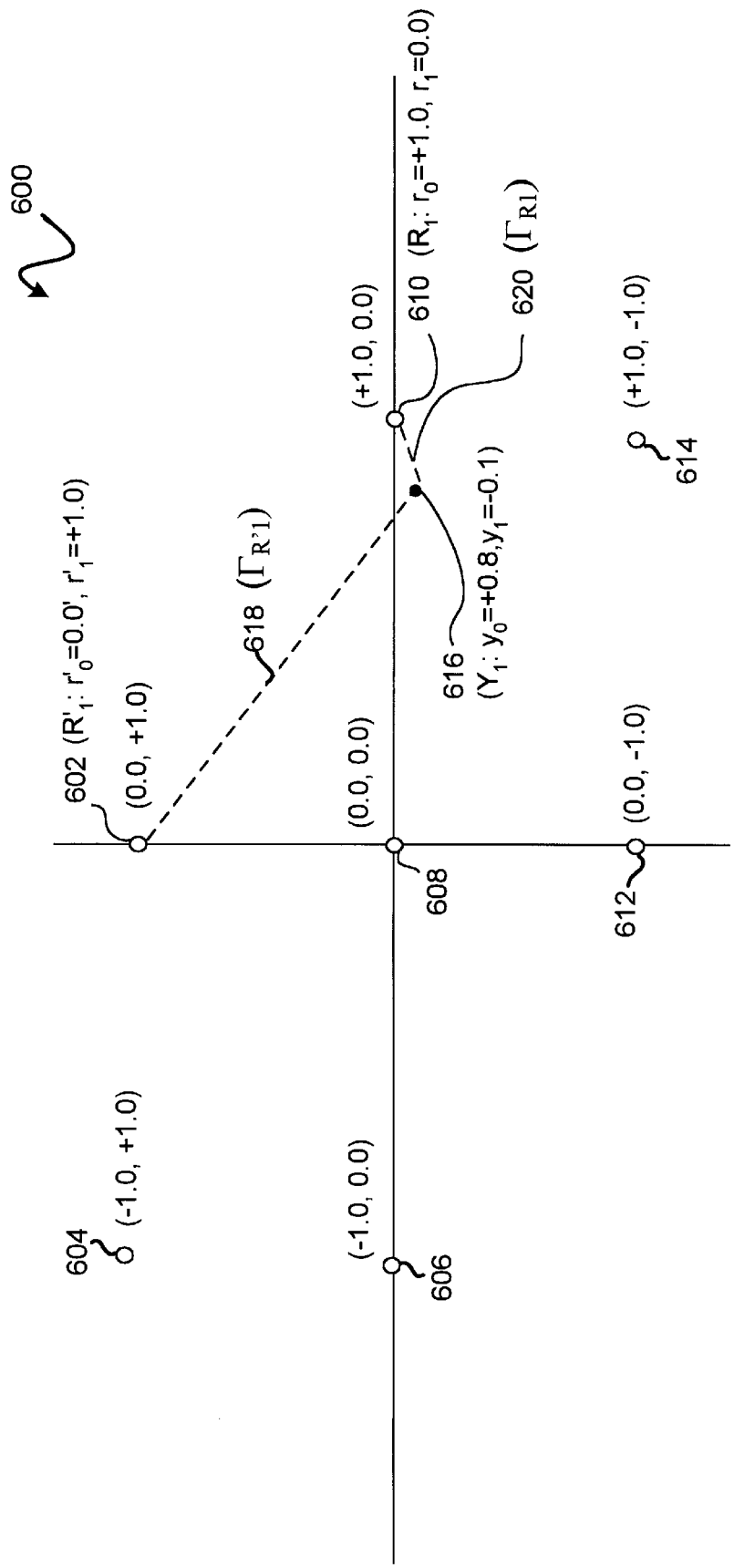
FIG. 6 is a signal space diagram illustrating two space distances $\Gamma_{R'1}$ and $\Gamma_{R1}$ used in computing channel metric $\Gamma_1$.

Referring to FIG. 6, signal space 600 illustrates the space distance corresponding to channel metric $\Gamma_1$. Signal space 600 includes possible expected sample points 602 (0.0,+1.0), 604 (−1.0,+1.0), 606 (−1.0,0.0), 608 (0.0,0.0), 610 (+1.0,0.0), 612 (0.0,−1.0), and 614 (+1.0,−1.0). Each possible expected sample point corresponds to a possible expected correct-sample subsequence $R_n$: $r_{n-1},r_n$ or a possible expected-error sample subsequence $R'_n$: $r'_{n-1},r'_n$.

For example, sample point 616 corresponds to the observed-sample subsequence $Y_1$: $y_0$=+0.8,$y_1$=−0.1. The channel metric $\Gamma_1$ (table 2, at column n=1) is 1.80 and represent a distance determined from the expected-observed sample subsequence $Y_1$ to the corresponding expected correct-sample subsequence $W_1$. The expected correct-sample subsequence $W_1$ is defined by the expected correct-sample subsequence $R_1$: $r_0$=+1.0,$r_1$=0.0 associated with the correct path in path route 504, and the expected error-sample subsequence $R'_1$: $r'_0$=0.0,$r'_1$=+1.0 associated with the error event path in path route 504.

Sample point 602 corresponds to the expected error-sample subsequence $R'_1$: $r'_0=0.0, r'_1=+1.0$. Sample point 610 corresponds to the expected correct-sample subsequence $R_1$: $r_0=+1.0, r=0.0$. Space distance 618 represents the channel metric component $\Gamma_{R'1}$ (1.85). Space distance 620 represents the channel metric component $\Gamma_{R1}$ (0.05). The channel metric $\Gamma_1$ (1.8) represents a distance determined from space distance 618 ($\Gamma_{R'1}=1.85$) minus space distance 620 ($\Gamma_{R1}=0.05$).

Table 2 shows a Viterbi state metric at a +1 state and a −1 state. The Viterbi state metric is computed for each state beginning from an initial state and continuing to a state at n=6. The initiate state $s_{initial}$ is—and the Viterbi state metric for the −1 state is 0.

Viterbi detector 220 has a structure defining a Viterbi engine for computing the +1 Viterbi state metric and the −1 Viterbi state metric. The Viterbi detector also has a path memory for retaining and generating a trellis path having the least accumulated state metrics. The Viterbi engine operates in a repeated cycle. During each cycle, it computes two Viterbi state metrics for each of the two respective states (+1 state and −1 state). The Viterbi engine computes a branch metric for each possible path entering each state, adds the branch metric to a previous Viterbi state metric to produce a candidate Viterbi state metric, and selects the candidate Viterbi state metric having the lowest value.

During each cycle, the path memory is updated so that it selects a path having the lowest accumulated Viterbi state metric. The Viterbi engine computes each branch metric by computing the square of the difference between the value of an observed sample $y_n$ and the value of a possible target sample $t_n$. The branch metric equation is $(y_n-t_n)^2$. Viterbi detector 220 includes branch metric registers for holding computed branch metrics and state metric registers for holding accumulated Viterbi state metrics.

The selected Viterbi state metric is a sum of a branch metric and a previous state metric having the least accumulated Viterbi state metric. The selected Viterbi state metric depends on the earliest observed sample in the observed sequence and the earliest target sample in the possible sample sequence.

Table 3 differs from table 1 in that the earliest observed sample $y_0$ is changed from +0.8 to +0.3. Channel metric $\Gamma_1$ (at column n=1) decreased from 1.8 to 0.8. The remaining channel metrics $\Gamma_2$ through $\Gamma_6$ are not affected by this change in the earliest observed sample $y_0$. Channel metrics $\Gamma_2$ through $\Gamma_6$ are independent of the earliest observed sample $y_0$. Each channel metric $\Gamma_n$ is independent of the earliest observed sample in every prior observed-sample subsequence $Y_n$ and the earliest expected sample subsequence in every prior expected sample-subsequence $W_n$.

Each Viterbi state metric (columns n=0 through n=6) is affected by changing the earliest observed sample $y_0$. Each Viterbi state metric (+1 state and −1 state) shown in columns n=1 through n=6 depends on the earliest observed sample $y_0$.

TABLE 3

| | initial state | n = 0 | n = 1 | n = 2 | n = 3 | n = 4 | n = 5 | n = 6 |
|---|---|---|---|---|---|---|---|---|
| test data sequence $\{b_n\}$ | | 1 | 0 | 0 | 0 | 0 | 1 | 0 |
| test data sequence $\{b^*_n\}$ | 0 | 1 | 1 | 1 | 1 | 1 | 0 | 0 |
| observed sample value $\{y_n\}$ | | +0.3 | −0.1 | −0.6 | +0.1 | +0.3 | −1.2 | −0.2 |
| expected sample value $\{r_n\}$ | | +1.0 | 0.0 | 0.0 | 0.0 | 0.0 | −1.0 | 0.0 |
| expected state information $\{s_n\}$ | − | + | + | + | + | + | − | − |
| channel metrics $\{\Gamma_n\}$ | | | .80 | 3.00 | .60 | 1.60 | 3.00 | 5.40 |
| Viterbi state metric (+1 state) | | .49 | .50 | .86 | .87 | .96 | 2.4 | 2.44 |
| Viterbi state metric (−1 state) | 0 | .09 | .10 | .46 | .47 | .56 | 1.00 | 1.04 |

Channel metric $\Gamma_n$ computation system 232 compares each channel metric $\Gamma_n$ to a channel metric $\Gamma_n$ defect threshold. For example, if the channel metric $\Gamma_n$ defect threshold is 1, channel metric $\Gamma_n$ computation system 232 will generate a defect discovery signal for channel metric $\Gamma_3$. The defect discovery signal indicates a defective site associated with observed samples $Y_2$ and $y_3$.

Channel metric $\Gamma_n$ accumulation system 234 receives and accumulates a sequence of the channel metrics $\{\Gamma_n\}$ to produce a sum of the channel metrics $\Sigma\Gamma_n$ and a sum of the squares of the metrics $\Sigma\Gamma_n^2$.

Microprocessor 34 receives the sum of the channel metrics $\Gamma_n$ and the sum of the squares of the channel metrics $\Gamma_n$ to compute the mean $\mu_\Gamma$ and the standard deviation $\sigma_\Gamma$. Microprocessor 34 also computes the ratio of the mean $\mu_\Gamma$ to the standard deviation $\sigma_\Gamma$. The ratio represents the signal to noise ratio. According to an alternate embodiment, microprocessor 34 estimates a BER from the ratio ($\mu_\Gamma/\sigma_\Gamma$).

HIDC 32 receives and transmits the ratio ($\mu_\Gamma/\sigma_\Gamma$) from microprocessor 34 to the host computer (not shown). Alternatively, HIDC 32 receives and transmits the BER from microprocessor 34 to the host computer (not shown). HIDC 32 receives the defect discovery signal and records the defective site in the defect list.

Referring to FIG. 7, table 700 shows eight simplified channel metric $\Gamma_n$ equations 706 corresponding to eight possible trellis path routes 708. Each channel metric $\Gamma_n$ equation 706 includes a constant C having a value equal to +2, 0 or −2; a $y_{n-1}$ coefficient having a value equal to +2 or −2; and a $y_n$ coefficient having a value equal to +2 or −2. Channel metric $\Gamma_n$ equations 706 are derived from the equation $[(y_{n-1}-r'_{n-1})^2+(y_n-r'_n)^2]-[(Y_{n-1}-r_{n-1})^2+(y_n-r_n)^2]$.

Column 702 provides a list of four possible expected-correct sample subsequences $R_n(r_{n-1}, r_n)$ for each state ($s_n=+$, $s_n=−$) Column 704 provides state information $s_n$ associated with each of the possible expected-correct sample subsequences $R_n(r_{n-1}, r_n)$. The expected-correct sample subsequences $R_n(r_{n-1}, r_n)$ 702 and state information $s_n$ (−or+) 704 define a set of eight conditions, each condition being associated with a corresponding channel metric equation $\Gamma_n$ 706.

Figure 8:
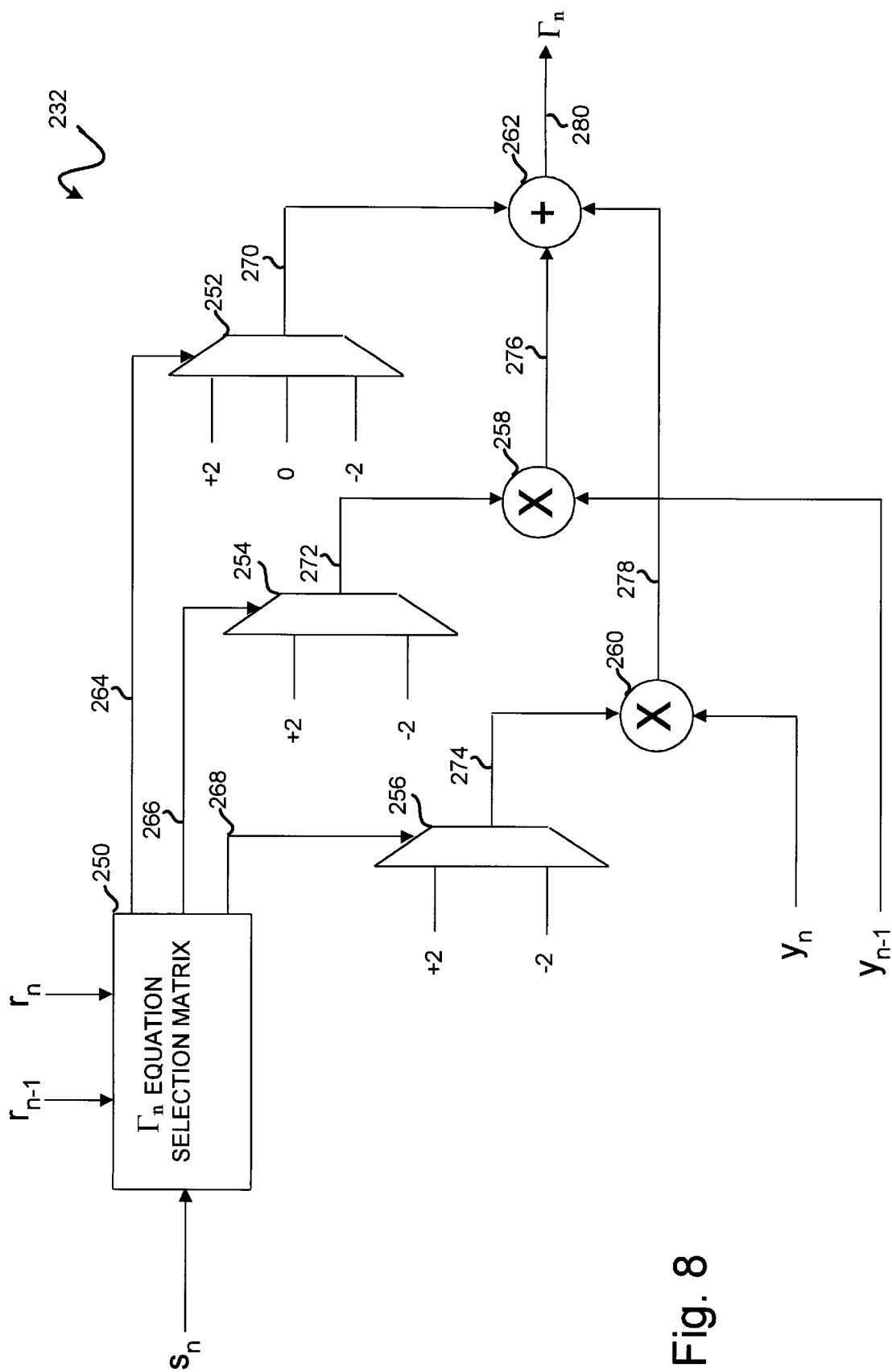
FIG. 8 is a block diagram of a channel metric $\Gamma_n$ computation system, the channel metric $\Gamma_n$ computation system including the set of conditions defined by table 700 of FIG. 7 for selecting a channel metric $\Gamma_n$ equation.

Referring to FIG. 8, channel metric $\Gamma_n$ computation system 232 computes a channel metric $\Gamma_n$ in accordance with the set of conditions defined in table 700 of FIG. 7. Channel metric $\Gamma_n$ computation system 232 includes a selection matrix 250, a first selector 252 for selecting a constant C having a value equal to +2,0,or 2, a second selector 254 for selecting a $y_{n-1}$ coefficient having a value equal to +2 or −2, a third selector 256 for selecting a $y_n$ coefficient having a value equal to +2 or −2, a first multiplier 258, a second multiplier 260, and a summer 262.

Equation selection matrix 250 receives an expected correct-sample subsequence $R_n(r_{n-1}, r_n)$ and state information $s_n$. Equation selection matrix 250 generates a first signal 264 representing the constant C, a second signal 266 representing the $y_{n-1}$ coefficient, and a third signal 268 representing the $y_n$ coefficient.

First selector 252 receives first signal 264 from equation selection matrix 250 and produces a signal 270 representing the selected constant C (+2,0,or −2). Second selector 254 receives second signal 266 from equation selection matrix 250 and produces a signal 272 representing the $y_{n-1}$ coefficient (+2 or −2). Third selector 256 receives third signal 268 from equation selection matrix 252 and produces a signal 274 representing the $y_n$ coefficient (+2 or −2).

First multiplier 258 receives an observed sample $Y_{n-1}$ and signal 272 representing the $y_{n-1}$ coefficient (+2 or −2) to produce a signal 276 representing a product of the observed sample $y_{n-1}$ and the $y_{n-1}$ coefficient (+2 or −2). Second multiplier 260 receives an observed sample $y_n$ and signal 274 representing the $y_n$ coefficient (+2 or −2) to produce a signal 278 representing a product of the observed sample $y_n$ and the $y_n$ coefficient (+2 or −2).

Summer 262 receives signal 270 representing the selected constant C (+2,0,or −2), signal 276 representing the product of the observed sample $y_{n-1}$ and the $Y_{n-1}$ coefficient (+2 or −2), and signal 278 representing the product of the observed sample $y_n$ and the $y_n$ coefficient (+2 or −2) to produce a signal 280 representing the channel metric $\Gamma_n$.

Continuing the above example, channel metric $\Gamma_n$ computation system 232 receives the observed-sample subsequence $Y_1$ ($y_0$=+0.8, $y_1$=−0.1), the expected correct-sample subsequence $R_1$($r_0$=+1,$r_1$=0), and state information $s_1$=+ associated with the expected-correct sample $r_1$=0. The $R_n$ and $s_n$ conditions corresponds to the channel metric $\Gamma_n$ equation 2($y_{n-1}$−$y_n$) in row 6 of table 700.

Equation selection matrix 250 receives the expected correct-sample subsequence $R_1$ ($r_0$=+1,$r_1$=0) and state information $s_1$=+. Equation selection matrix 250 generates first signal 264 representing the constant C having a value equal to 0, a second signal 266 representing the $Y_{n-1}$ coefficient having a value equal to +2, and a third signal 266 representing the $y_n$ coefficient having a value equal to −2.

First selector 252 receives first signal 264 from equation selection matrix 250 and produces a signal 270 representing the selected constant C (0). Second selector 254 receives second signal 266 from equation selection matrix 250 and produces a signal 272 representing the $y_{n-1}$ coefficient (+2). Third selector 256 receives third signal 268 from equation selection matrix 250 and produces a signal 274 representing the $y_n$ coefficient (−2).

First multiplier 258 receives the observed sample $y_0$=+0.8 and signal 272 representing the $y_{n-1}$ coefficient (+2) to produce a signal 276 representing a value equal to +1.6. Second multiplier 260 receives the observed sample −0.1 and signal 274 representing the $y_n$ coefficient (−2) to produce a signal 278 representing a value equal to +0.2.

Summer 262 receives signal 270 representing the selected constant having a value equal to 0, signal 276 representing the value equal to +1.6, and signal 278 representing the value equal to +0.2 to produce a signal 280 representing the channel metric $\Gamma_1$ having a value equal to 1.8.

According to another embodiment, computation circuitry in Viterbi detector 226 can be used for computing each channel metric $\Gamma_n$. Viterbi detector 226 receives the sequence of observed samples $\{y_n\}$ and state information $\{s_n\}$ associated with the sequence of expected samples $\{w_n\}$ to produce the sequence of channel metrics $\{\Gamma_n\}$. In this embodiment, BIST mode test system 208 includes the channel metric $\Gamma_n$ accumulation system 234 only. Channel metric $\Gamma_n$ accumulation system 234 receives the sequence of channel metrics $\{\Gamma_n\}$ from Viterbi detector 226 and accumulates a sum of the channel metrics $\Gamma_n$ ($\Sigma\Gamma_n$) and a sum of the squares of the channel metrics $\Gamma_n$ ($\Sigma\Gamma_n^2$).

Figure 9:
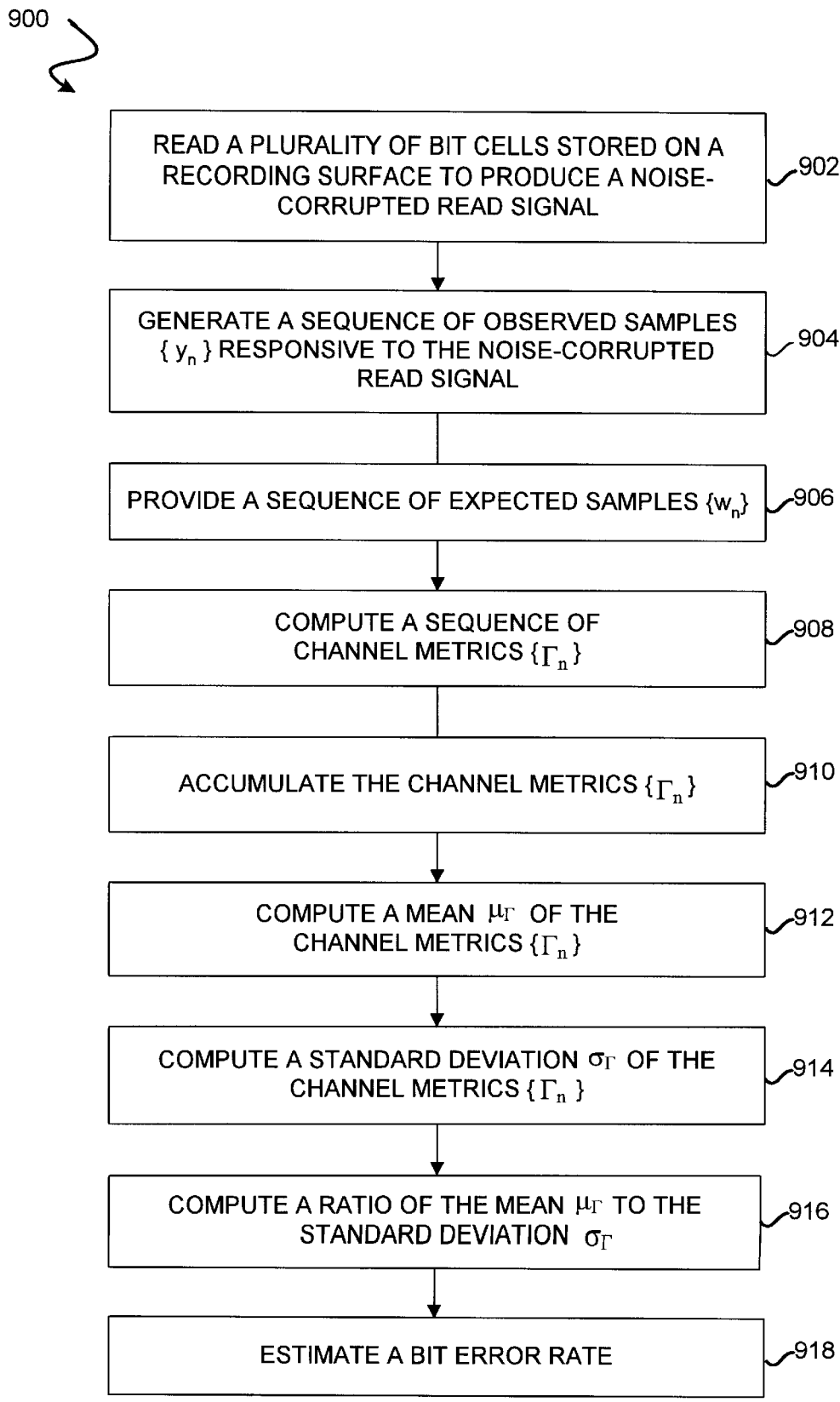
FIG. 9 is a flow chart showing the steps for estimating the BER for the disk drive of FIG. 1.

Referring to FIG. 9, flow chart 900 describes a method for computing a sequence of channel metrics $\{\Gamma_n\}$ for characterizing the performance of a disk drive (such as disk drive 1 of FIG. 1). At step 902, a transducer (such as 20 of FIG. 1) reads a plurality of bit cells stored on a recording surface in the disk drive to produce a noise-corrupted read signal. At step 904, a sampled data equalizer (such as 218 of FIG. 2) generates a sequence of observed samples $\{y_n\}$ responsive to the noise-corrupted read signal. The sequence of observed samples $\{y_n\}$ forms a sequence of observed-sample subsequences $\{Y_n\}$. Each observed-sample subsequence $Y_n$ has an earliest observed sample and a latest observed sample.

At step 906, an expected sample generator (such as 230 of FIG. 2) provides a sequence of expected samples $\{w_n\}$. The sequence of expected samples forms a sequence of expected-sample subsequences $\{W_n\}$. Each expected-sample subsequence $W_n$ has an earliest expected sample and a latest expected sample. At steps 908 and 910, a channel metric $\Gamma_n$ computation system (such as 232 of FIG. 2) computes a sequence of channel metrics $\{\Gamma_n\}$, and a channel metric $\Gamma_n$ accumulation system (such as 234 of FIG. 2) accumulates a sum of the channel metrics $\Gamma_n$ ($\Sigma\Gamma_n$) and a sum of the squares of the channel metrics $\Gamma_n$ ($\Sigma\Gamma_n$). Each channel metric $\Gamma_n$ is a function of a distance determined from one of the observed-sample subsequences $Y_n$ to the corresponding expected-sample subsequence $W_n$. Each channel metric $\Gamma_n$ is independent of the earliest observed sample in every prior observed-sample subsequence $Y_n$ and the earliest expected sample in every prior expected-sample subsequence $W_n$.

At step 912, a processor (such as 34 of FIG. 1) computes a mean $\mu_\Gamma$ of the accumulated channel metrics $\{\Gamma_n\}$. At step 914, the processor computes a standard deviation $\sigma_\Gamma$ of the accumulated channel metrics $\{\Gamma_n\}$. At step 916, the processor computes a ratio of the mean $\mu_\Gamma$ to the standard deviation $\sigma_\Gamma$. The ratio corresponds to a signal to noise ratio. Alternatively, at step 918, the processor estimates the BER from the ratio ($\mu_\Gamma/\sigma_\Gamma$). For example, the BER can be estimated from Q ($\mu_\Gamma/\sigma_\Gamma$), where Q is the Gaussian Q function.

The ratio ($\mu_\Gamma/\sigma_\Gamma$) constitutes a very precise basis for characterizing the performance of disk drive 1 because the ratio is based on computing multiple channel metrics $\Gamma_n$ for a sequence of observed sample $\{y_n\}$. The ratio ($\mu_\Gamma/\sigma_\Gamma$) provides for rapidly characterizing the performance of disk drive 1. The ratio ($\mu_\Gamma/\sigma_\Gamma$) can be used for rapidly and precisely estimating the BER for disk drive 1. For example, about $10^3$ observed samples can produce a precise estimate of BER when the BER is in the neighborhood of $10^{-6}$ BER. The sequence of channel metrics $\{\Gamma_n\}$ can be used for discovering defective sites on recording surface 14a of disk drive 1.

We claim:

1. A disk drive having a normal mode of operation and a built-in self-test mode of operation for producing a sequence of channel metrics $\{\Gamma_n\}$, the disk drive comprising:

a recording surface having a plurality of bit cells;

a transducer for reading the plurality of bit cells to produce a noise-corrupted read signal;

means responsive to the noise-corrupted read signal for generating a sequence of observed samples $\{y_n\}$, the sequence of observed-samples $\{y_n\}$ forming a sequence of observed-sample subsequences $\{Y_n\}$, each observed sample sequence $Y_n$ having an earliest observed sample and a latest observed sample;

means operative during the built-in self-test mode of operation for providing a sequence of expected samples {$w_n$}, the sequence of expected samples forming a sequence of expected-sample subsequences {$W_n$}, each expected-sample subsequence $W_n$ having an earliest expected sample and a latest expected sample;

computation means for computing a sequence of channel metrics {$\Gamma_n$}, each channel metric $\Gamma_n$ being a function of a distance determined from one of the observed-sample subsequences $Y_n$ to the corresponding expected-sample sequence $W_n$, each channel metric $\Gamma_n$ being independent of the earliest observed sample in every prior observed-sample subsequence $Y_n$ and the earliest expected sample in every prior expected-sample subsequence $W_n$;

means for computing a mean $\mu_\Gamma$ of the channel metrics $\Gamma_n$;

means for computing a standard deviation $\sigma_\Gamma$ of the channel metrics $\Gamma_n$; and means for computing a ratio of the mean $\mu_\Gamma$ to the standard deviation $\sigma_\Gamma$, the ratio ($\mu_\Gamma/\sigma_\Gamma$) corresponding to a signal to noise ratio.

2. The disk drive of claim 1 further comprising means for estimating a bit error rate of the disk drive from the ratio ($\mu_\Gamma/\sigma_\Gamma$).

3. The disk drive of claim 2, wherein the means for estimating the bit error rate comprises a means for computing $Q(\mu_\Gamma/\sigma_\Gamma)$ where Q is a Gaussian Q function.

4. A method for computing a sequence of channel metrics {$\Gamma_n$} for characterizing the performance of a disk drive, the method comprising the steps of:

reading a plurality of bit cells stored on a recording surface in the disk drive to produce a noise-corrupted read signal;

generating a sequence of observed samples {$y_n$}, the sequence of observed-samples {$y_n$} forming a sequence of observed-sample sequences {$Y_n$}, each observed sample sequence $Y_n$ having an earliest observed sample and a latest observed sample;

providing a sequence of expected samples {$w_n$}, the sequence of expected samples forming a sequence of expected-sample subsequences {$W_n$}, each expected-sample subsequence $W_n$ having an earliest expected sample and a latest expected sample;

computing a sequence of channel metrics {$\Gamma_n$}, each channel metric $\Gamma_n$ being a function of a distance determined from one of the observed-sample subsequences $Y_n$ to the corresponding expected-sample sequence $W_n$, each channel metric $\Gamma_n$ being independent of the earliest observed sample in every prior observed-sample subsequence $Y_n$ and the earliest expected sample in every prior expected-sample subsequence $W_n$; and computing a mean $\mu_\Gamma$ of the channel metrics $\Gamma_n$;

computing a standard deviation $\sigma_\Gamma$ of the channel metrics $\Gamma_n$;

computing a ratio of the mean $\mu_\Gamma$ to the standard deviation $\sigma_\Gamma$, the ratio ($\mu_\Gamma/\sigma_\Gamma$) corresponding to a signal to noise ratio.

5. The method of claim 4 further comprising the step of estimating a bit error rate of the disk drive from the ratio ($\mu_\Gamma/\sigma_\Gamma$).

6. The disk drive of claim 5, wherein the step of estimating the bit error rate comprises the step of computing $Q(\mu_\Gamma/\sigma_\Gamma)$ where Q is a Gaussian Q function.

7. A method for estimating a bit error rate for a disk drive, the method comprising the steps of:

reading a plurality of bit cells stored on a recording surface in the disk drive to produce a noise-corrupted read signal;

generating a sequence of observed samples {$y_n$} responsive to the noise-corrupted read signal, the sequence of observed samples {$y_n$} forming a sequence of observed-sample subsequences {$Y_n$}, each observed-sample subsequence $Y_n$ having an earliest observed sample and a latest observed sample;

providing a sequence of expected samples {$w_n$}, the sequence of expected samples forming a sequence of expected-sample subsequences {$W_n$}, each expected-sample subsequence $W_n$ having an earliest expected sample and a latest expected sample;

computing a sequence of channel metrics {$\Gamma_n$}, each channel metric $\Gamma_n$ being a function of a distance determined from one of the observed-sample subsequences $Y_n$ to the corresponding expected-sample subsequence $W_n$, each channel metric $\Gamma_n$ being independent of the earliest observed sample in every prior observed-sample subsequence $Y_n$ and the earliest expected sample in every prior expected-sample subsequence $W_n$;

computing a mean $\mu_\Gamma$ of the channel metrics {$\Gamma_n$};

computing a standard deviation $\sigma_\Gamma$ of the channel metrics {$\Gamma_n$};

computing a ratio of the mean $\mu_\Gamma$ to the standard deviation $\sigma_\Gamma$, the ratio ($\mu_\Gamma/\sigma_\Gamma$) corresponding to a signal to noise ratio; and estimating the bit error rate from the ratio ($\mu_\Gamma/\sigma_\Gamma$).

8. The disk drive of claim 7, wherein the step of estimating the bit error rate comprises the step of computing $Q(\mu_\Gamma/\sigma_\Gamma)$ where Q is a Gaussian Q function.

9. A disk drive having a normal mode of operation and a built-in self-test mode of operation for producing a sequence of channel metrics {$\Gamma_n$}, the disk drive comprising:

a recording surface having a plurality of bit cells;

a transducer for reading the plurality of bit cells to produce a noise-corrupted read signal;

a sampler responsive to the noise-corrupted read signal for generating a sequence of observed samples {$y_n$}, the sequence of observed-samples {$y_n$} forming a sequence of observed-sample sequences {$Y_n$};

an expected sample generator operative during the built-in self-test mode of operation for providing a sequence of expected samples {$w_n$}, the sequence of expected samples forming a sequence of expected-sample subsequences {$W_n$};

channel metrics computer for computing a sequence of channel metrics {$\Gamma_n$}, each channel metric $\Gamma_n$ being a function of a distance determined from one of the observed-sample subsequences $Y_n$ to the corresponding expected-sample sequence $W_n$; and a ratio computer for computing a mean $\mu_\Gamma$ of the channel metrics $\Gamma_n$, a standard deviation $\sigma_\Gamma$ of the channel metrics $\Gamma_n$, and a ratio of the mean $\mu_\Gamma$ to the standard deviation $\sigma_\Gamma$, the ratio ($\mu_\Gamma/\sigma_\Gamma$) corresponding to a signal to noise ratio.

10. The disk drive of claim 9, furthers comprising a bit error rate estimator for estimating a bit error rate of the disk drive by computing $Q(\mu_\Gamma/\sigma_\Gamma)$ where Q is a Gaussian Q function.

11. A disk drive having a normal mode of operation and a built-in self-test mode of operation for producing a sequence of channel metrics {$\Gamma_n$}, the disk drive comprising:

a recording surface having a plurality of bit cells;

a transducer for reading the plurality of bit cells to produce a noise-corrupted read signal;

a sampler responsive to the noise-corrupted read signal for generating a sequence of observed samples $\{y_n\}$, the sequence of observed-samples $\{Y_n\}$ forming a sequence of observed-sample sequences $\{Y_n\}$;

an expected sample generator operative during the built-in self-test mode of operation for providing a sequence of expected samples $\{w_n\}$, the sequence of expected samples forming a sequence of expected-sample subsequences $\{W_n\}$;

channel metrics computer for computing a sequence of channel metrics $\{\Gamma_n\}$, each channel metric $\Gamma_n$ being a function of a distance determined from one of the observed-sample subsequences $Y_n$ to the corresponding expected-sample sequence $W_n$, the channel metrics computer comprising:

equation circuitry for implementing a plurality of equations to compute a plurality of different channel metrics $\Gamma_n$; and an equation selection matrix for selecting between the different channel metrics $\Gamma_n$ computed by the equation circuitry, the selection based on a selected number of the expected samples $\{w_n\}$, the equation matrix generating a selected channel metric $\Gamma_n$; and an accumulator for accumulating the selected channel metric $\Gamma_n$.

12. A method for computing a sequence of channel metrics $\{\Gamma_n\}$ for characterizing the performance of a disk drive comprising a recording surface having a plurality of bit cells and a transducer for reading the plurality of bit cells to produce a noise-corrupted read signal, the method comprising the steps of:

sampling the noise-corrupted read signal to generate a sequence of observed samples $\{y_n\}$, the sequence of observed-samples $\{y_n\}$ forming a sequence of observed-sample sequences $\{Y_n\}$;

generating, during the built-in self-test mode of operation, a sequence of expected samples $\{w_n\}$, the sequence of expected samples forming a sequence of expected-sample subsequences $\{W_n\}$;

computing a sequence of channel metrics $\{\Gamma_n\}$, each channel metric $\Gamma_n$ being a function of a distance determined from one of the observed-sample subsequences $Y_n$ to the corresponding expected-sample sequence $W_n$, the step of computing the channel metrics comprising the steps of:

computing a plurality of different channel metrics $\Gamma_n$; and selecting between the different channel metrics $\Gamma_n$ based on a selected number of the expected samples $\{w_n\}$ to generate a selected channel metric $\Gamma_n$; and accumulating the selected channel metric $\Gamma_n$.

\* \* \* \* \*